US012566473B2

(12) United States Patent
Jung et al.

(10) Patent No.: US 12,566,473 B2
(45) Date of Patent: Mar. 3, 2026

(54) DISPLAY DEVICE

(71) Applicant: Samsung Display Co., Ltd., Yongin-si (KR)

(72) Inventors: Sung-Ki Jung, Yongin-si (KR); Minjee Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 357 days.

(21) Appl. No.: 18/340,975

(22) Filed: Jun. 26, 2023

(65) Prior Publication Data

US 2024/0118731 A1 Apr. 11, 2024

(30) Foreign Application Priority Data

Sep. 30, 2022 (KR) ........................ 10-2022-0125398

(51) Int. Cl.
*G06F 1/16* (2006.01)
*H04M 1/02* (2006.01)

(52) U.S. Cl.
CPC .......... *G06F 1/1643* (2013.01); *G06F 1/1616* (2013.01); *G06F 1/1652* (2013.01); *G06F 1/1656* (2013.01); *H04M 1/0216* (2013.01); *H04M 1/0268* (2013.01)

(58) Field of Classification Search
CPC .... G06F 1/1656; G06F 1/1616; G06F 1/1643; H04M 1/0216; H04M 1/0268
See application file for complete search history.

(56) References Cited

U.S. PATENT DOCUMENTS

| | | | | |
|---|---|---|---|---|
| 10,642,313 B1* | 5/2020 | Wu | ......................... | H10K 59/65 |
| 11,256,359 B2 | 2/2022 | Chou et al. | | |
| 2020/0022267 A1* | 1/2020 | Han | ....................... | B32B 15/18 |
| 2020/0209998 A1* | 7/2020 | Shin | ...................... | G06F 1/1641 |
| 2022/0129094 A1* | 4/2022 | Tatsuno | ................ | G06F 1/1677 |
| 2022/0149337 A1* | 5/2022 | Horiuchi | ........... | G02F 1/133325 |
| 2023/0060493 A1* | 3/2023 | Wu | ...................... | H10K 77/111 |

FOREIGN PATENT DOCUMENTS

| | | |
|---|---|---|
| JP | 2022535171 A | 8/2022 |
| KR | 20190114863 A | 10/2019 |
| KR | 20210097650 A | 8/2021 |
| KR | 1020210150942 A | 12/2021 |

* cited by examiner

*Primary Examiner* — Anthony Q Edwards
(74) *Attorney, Agent, or Firm* — CANTOR COLBURN LLP

(57) ABSTRACT

A display device includes a display module, a first support plate disposed below the display module, a first digitizer disposed below the first support plate, a second digitizer disposed below the first support plate and spaced apart from the first digitizer in a first direction, a second-1 support plate disposed below the first digitizer, and a second-2 support plate disposed below the second digitizer, the second digitizer extends between the first support plate and the second-1 support plate to overlap the second-1 support plate.

20 Claims, 17 Drawing Sheets

DISPLAY DEVICE

This application claims priority to Korean Patent Application No. 10-2022-0125398, filed on Sep. 30, 2022, and all the benefits accruing therefrom under 35 U.S.C. § 119, the entire contents of which are hereby incorporated by reference.

BACKGROUND

(1) Field

The present disclosure herein relates to a display device.

(2) Description of the Related Art

Electronic equipment for providing an image to a user, such as smartphones, digital cameras, laptop computers, navigations, and smart televisions, includes a display device for displaying an image. The display device generates an image to provide the image to the user, through a display screen of the display device.

Various types of display devices have been developed with the development of technology used in the display devices. For example, various flexible display devices that are deformed into a curved shape, folded, or rolled are being developed. The flexible display device may be easily transported to improve a user's convenience thereof.

Among flexible display devices, a foldable display device is foldable with respect to a folding axis. The foldable display device may include a display module that is foldable at a folding area thereof with respect to a folding axis, and a support disposed below the display module to support the display module. The support may be foldable at folding area thereof, together with the display module. The foldable display device may further include a digitizer disposed below the display module. The digitizer may be disconnected or separated so as not to overlap the folding areas of the display module or the support, and to be disposed below the non-folding areas of the display module.

SUMMARY

The present disclosure provides a display device having a digitizer that is capable of being easily folded or bent at a folding area of the display device.

An embodiment of the invention provides a display device including a display module, a first support plate disposed below the display module, a first digitizer disposed below the first support plate, a second digitizer disposed below the first support plate and spaced apart from the first digitizer in a first direction, a second-1 support plate disposed below the first digitizer, and a second-2 support plate disposed below the second digitizer, the second digitizer extends along the first direction between the first support plate and the second-1 support plate and overlaps the second-1 support plate.

In an embodiment of the invention, a display device includes a display module, a first support plate disposed below the display module and including a first non-folding part, a folding part, and a second non-folding part, a first digitizer disposed below the first non-folding part, a second digitizer disposed below the second non-folding part, a second-1 support plate disposed below the first digitizer, and a second-2 support plate disposed below the second digitizer, the second digitizer extends below the folding part between the second non-folding part and the second-2 support plate so as to be adjacent to one side of the first digitizer.

In an embodiment of the invention, a display device includes a display module, a first support plate disposed below the display module and including a first non-folding part, a folding part, and a second non-folding part, a first digitizer disposed below the first non-folding part, a second digitizer disposed below the second non-folding part, a second-1 support plate disposed below the first digitizer, and a second-2 support plate disposed below the second digitizer, the second digitizer extends between the second-1 support plate and the first support plate between the second non-folding part and the second-2 support plate, and when viewed on a plane, the second digitizer has an area greater than that of the first digitizer.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings:

FIG. 11 is a cross-sectional view illustrating a folded state of the display device illustrated in FIG. 10;

FIG. 16 is a cross-sectional view illustrating a folded state of the display device of FIG. 15.

FIG. 18 is a cross-view illustrating a folded state of the display device of FIG. 17.

DETAILED DESCRIPTION

Figure 1:
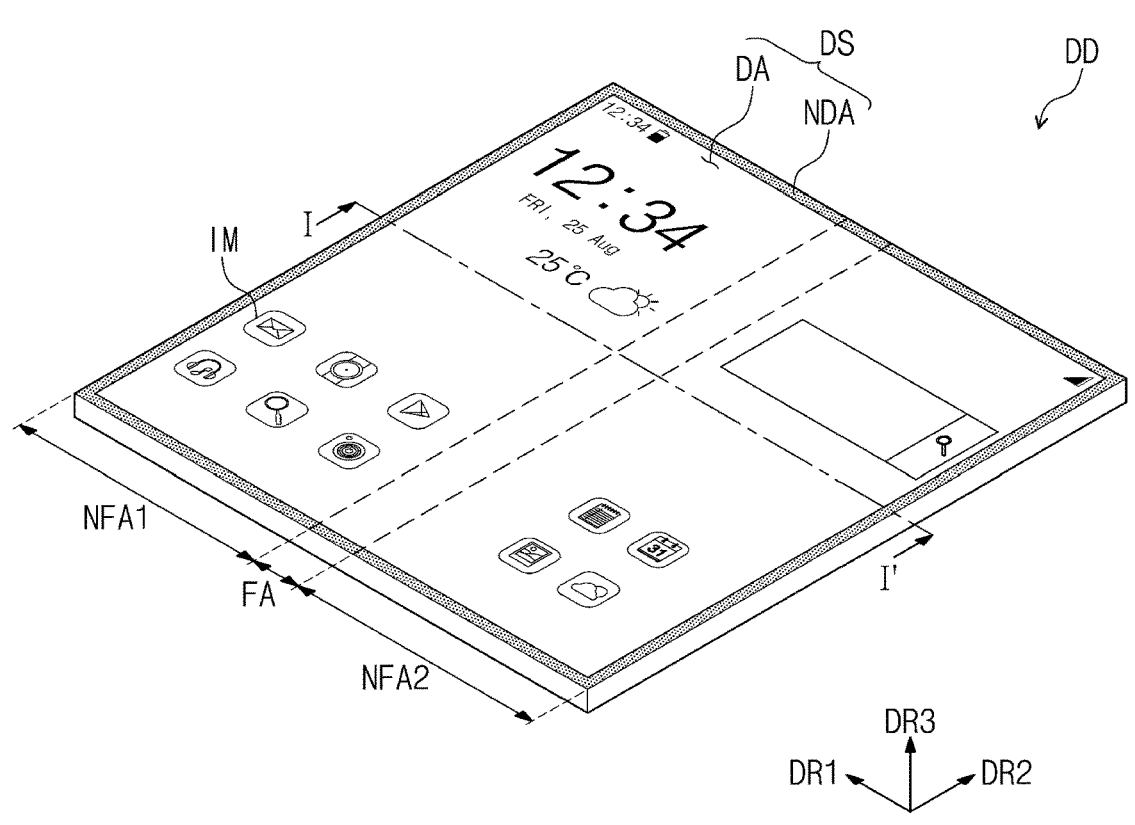
FIG. 1 is a perspective view of a display device according to an embodiment of the invention.

In this specification, it will also be understood that when one component (or area, layer, portion) is referred to as being related to another element such as being "on", "connected to", or "coupled to" another component, it can be directly disposed/connected/coupled on/to the one component, or an intervening third component may also be present. In contrast, when one component (or area, layer, portion) is referred to as being related to another element such as being "directly on", "directly connected to", or "directly coupled to" another component, no intervening third component is present therebetween.

Like reference numerals refer to like elements throughout. Also, in the figures, the thickness, ratio, and dimensions of components are exaggerated for clarity of illustration.

The term "and/or" includes any and all combinations of one or more of the associated listed items.

It will be understood that although the terms such as 'first' and 'second' are used herein to describe various elements, these elements should not be limited by these terms. These terms are used only to distinguish one component from other components. For example, a first element referred to as a first element in an embodiment can be referred to as a second element in another embodiment without departing from the scope of the appended claims.

The terms of a singular form may include plural forms unless referred to the contrary. For example, a reference number labeling a singular form of an element within the figures may be used to reference a plurality of the singular element within the text of the disclosure. As used herein, "a" "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or."

Also, "under", "below", "above", "upper", and the like are used for explaining relation association of components illustrated in the drawings. The terms may be a relative concept and described based on directions expressed in the drawings.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by a person of ordinary skill in the art to which the invention belongs. In addition, terms such as terms defined in commonly used dictionaries should be interpreted as having a meaning consistent with the meaning in the context of the related technology, and unless explicitly defined here, they are interpreted as too ideal or too formal sense.

The meaning of 'include' or 'comprise' specifies a property, a fixed number, a process, an operation, an element, a component or a combination thereof, but does not exclude other properties, fixed numbers, processes, operations, elements, components or combinations thereof.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the accompanying drawings.

Figure 2:
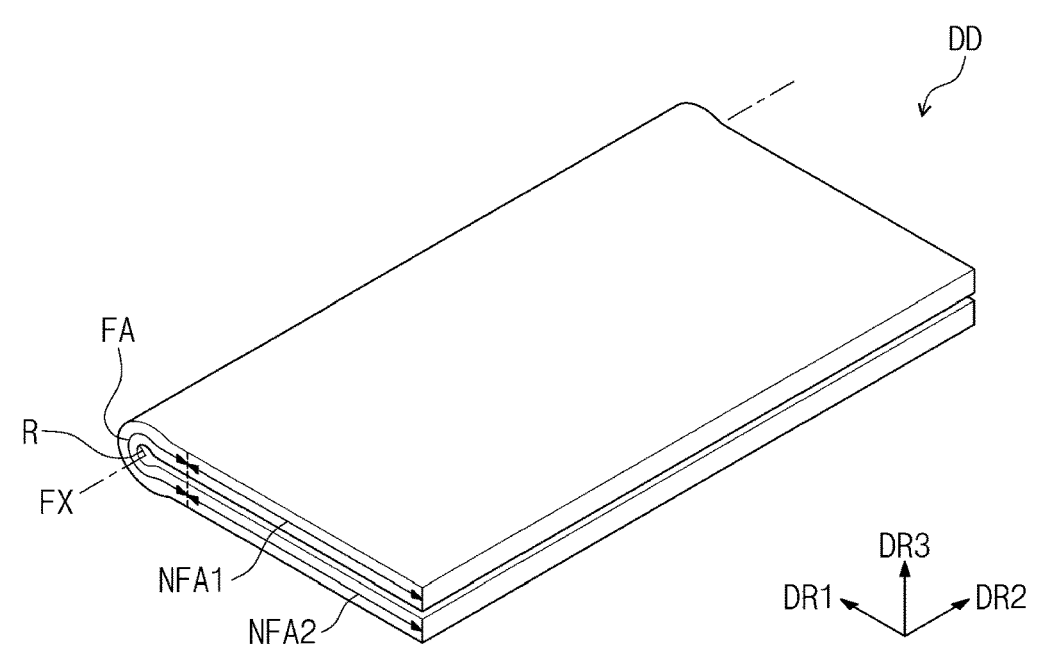
FIG. 2 is a view illustrating a folded state of the display device of FIG. 1.

FIG. 1 is a perspective view of a display device DD according to an embodiment of the invention. FIG. 2 is a view illustrating a folded state of the display device DD of FIG. 1.

Referring to FIG. 1, a display device DD which is unfolded or flat according to an embodiment of the invention, has a rectangular shape having short sides extending in a first direction DR1 and long sides which extend in a second direction DR2 crossing the first direction DR1. That is, the display device DD which is unfolded or flat may be disposed in a plane defined by the first direction DR1 and the second direction DR2 which cross each other. However, the embodiment of the invention is not limited thereto. For example, the display device DD may have various shapes in a plan view (e.g., a planar shape) such as a circular shape, a polygonal shape, and the like. The display device DD may be a flexible display device.

Hereinafter, a direction that substantially perpendicularly crosses a plane defined by the first direction DR1 and the second direction DR2, is defined as a third direction DR3. The third direction DR3 may define a thickness direction of the display device DD and various components or layers thereof. Also, in this specification, the term "viewed from the plane" may be defined as a view along the third direction DR3.

The display device DD may include a folding area FA, and a non-folding area provided in plural including a plurality of non-folding areas NFA1 and NFA2 which are adjacent to the folding area FA. The non-folding areas NFA1 and NFA2 may include a first non-folding area NFA1 and a second non-folding area NFA2. The folding area FA may be disposed between the first non-folding area NFA1 and the second non-folding area NFA2. The first non-folding area NFA1, the folding area FA, and the second non-folding area NFA2 may be arranged in order, in (or along) the first direction DR1.

For example, although one of the folding area FA, and two non-folding areas NFA1 and NFA2 are illustrated, the embodiment of the invention is not limited thereto. For example, the number of folding area FA and the number of non-folding areas NFA1 and NFA2 are not limited thereto. For example, the display device DD may include more than two non-folding areas, and a plurality of folding areas respectively between the non-folding areas.

A top surface of the display device DD which is furthest along the third direction DR3, may be defined as a display surface DS and be extended along a plane defined by the first direction DR1 and the second direction DR2 crossing each other. One or more of an image IM generated from the display device DD may be provided to outside the display device DD, such as to a user of the display device DD, through the display surface DS.

The display surface DS may include a display area DA and a non-display area NDA which is adjacent to the display area DA, such as extending around the display area DA. An image IM may be displayed on or at the display area DA, but may not be displayed on or at the non-display area NDA. The non-display area NDA may surround the display area DA and define an edge of the display device DD, such as an outer edge thereof. The non-display area NDA may include a color such as a printed pattern which is printed with a predetermined color.

Although not shown, the display device DD may include at least one sensor and at least one camera as examples of a functional component which provides a function to the display device DD, such as by using light, heat, pressure, location proximity, etc. The sensor may be a proximity sensor, but types of sensors are not limited thereto. The camera may photograph an external image.

Referring to FIG. 2, the display device DD may be a folding-type (foldable) display device DD that is capable of being folded or unfolded. For example, the folding area FA may be bendable to be bent with respect to a folding axis FX parallel to the second direction DR2, and thus, the display device DD may be folded about the folding axis FX. The folding axis FX may be defined as a long axis that is parallel to the long side of the display device DD. The folding area FA may be bent to have a curvature radius R. That is, the display device DD which is bent at the folding area FA may have a radius of curvature at the folding area FA. Various components or layers of the display device DD may include a display area DA, a non-display area NDA, a folding area FA, a non-folding area, a folding axis FX, etc. corresponding to those described above.

When folding the display device DD, portions of the first non-folding area NFA1 and the second non-folding areas NFA2 may face each other, and the display device DD may be in-folded to prevent the display surface DS from being exposed to the outside. However, the embodiment of the invention are not limited thereto. For example, the display device DD may be out-folded so that the display surface DS is exposed to the outside with respect to the folding axis FX.

A distance between the first non-folding area NFA1 and the second non-folding area NFA2 may be less than twice the curvature radius R. In this case, the folding area FA may be folded to define a dumbbell shape of the display device DD.

Figure 3:
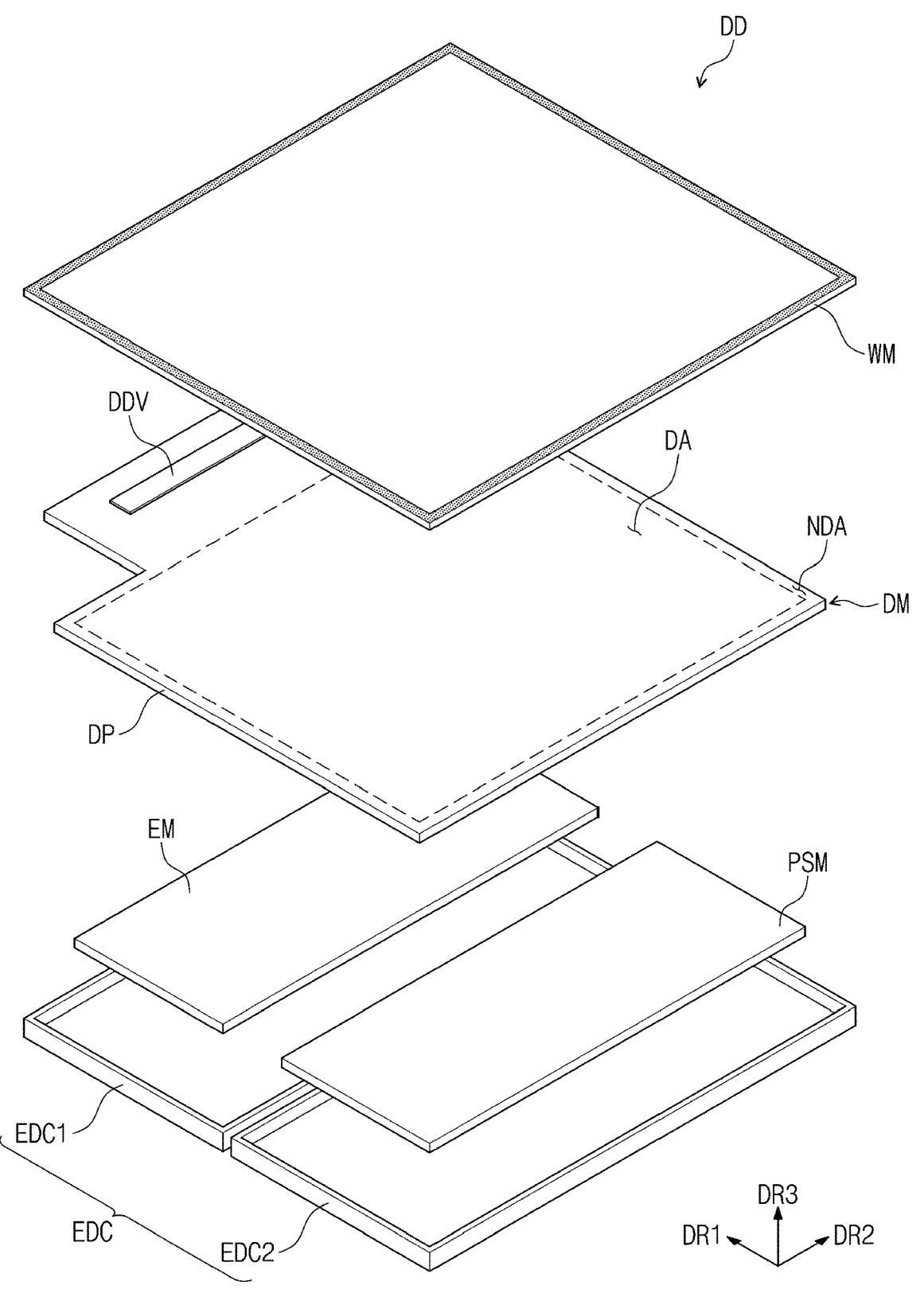
FIG. 3 is an exploded perspective view of the display device illustrated in FIG. 1.

FIG. 3 is an exploded perspective view of the display device illustrated in FIG. 1.

Referring to FIG. 3, the display device DD may include a window module WM, a display module DM, an electronic module EM, a power module PSM, and a case EDC. Although not shown separately, the display device DD may further include a mechanical structure (e.g., a hinge) controlling a folding operation of the display module DM.

The display module DM may generate an image IM and sense an external input from outside thereof. The window module WM may provide or define a front surface of the display device DD. The window module WM may be disposed on the display module DM to protect the display module DM. The window module WM may transmit light generated in the display module DM, to outside the display device DD, to provide the light to the user of the display device DD.

The display module DM may include at least a display panel DP. Although only the display panel DP among the laminated structure of the display module DM is illustrated in FIG. 3, the display module DM may further include a plurality of components disposed above and below the display panel DP. A detailed laminated structure of the display module DM will be described in detail below. The display panel DP may include a display area DA and a non-display area NDA, which correspond to the display area DA (see FIG. 1) and the non-display area NDA (see FIG. 1) of the display device DD, respectively.

The display module DM may include a data driver DDV disposed on the non-display area NDA of the display panel DP. The data driver DDV may be manufactured or provided in the form of an integrated circuit chip and mounted to the display panel DP at the non-display area NDA thereof. However, the embodiment of the invention is not limited thereto, and the data driver DDV may be mounted on a flexible circuit board FPCB which is external to the display panel DP and connected to the display panel DP.

The electronic module EM and the power module PSM may be disposed below the display module DM. Although not shown, the electronic module EM and the power module PSM may be connected to each other through a separate flexible circuit board. The electronic module EM may control an operation of the display module DM. The power module PSM may supply power such as electrical power to the display module DM.

The case EDC may accommodate the window module WM, the display module DM, the electronic module EM, and the power module PSM, at a receiving space of the case EDC. The case EDC as a housing may include two cases, e.g., a first case EDC1 and a second case EDC2 to fold the display module DM. The first and second cases EDC1 and EDC2 may lengthwise extend in the second direction DR2 and may be arranged adjacent to each other in the first direction DR1.

Although not shown, the display device DD may further include a hinge structure that connects the first and second cases EDC1 and EDC2 to each other. The case EDC may be coupled to the window module WM. The case EDC may protect the window module WM, the display module DM, the electronic module EM, and the power module PSM.

Figure 4:
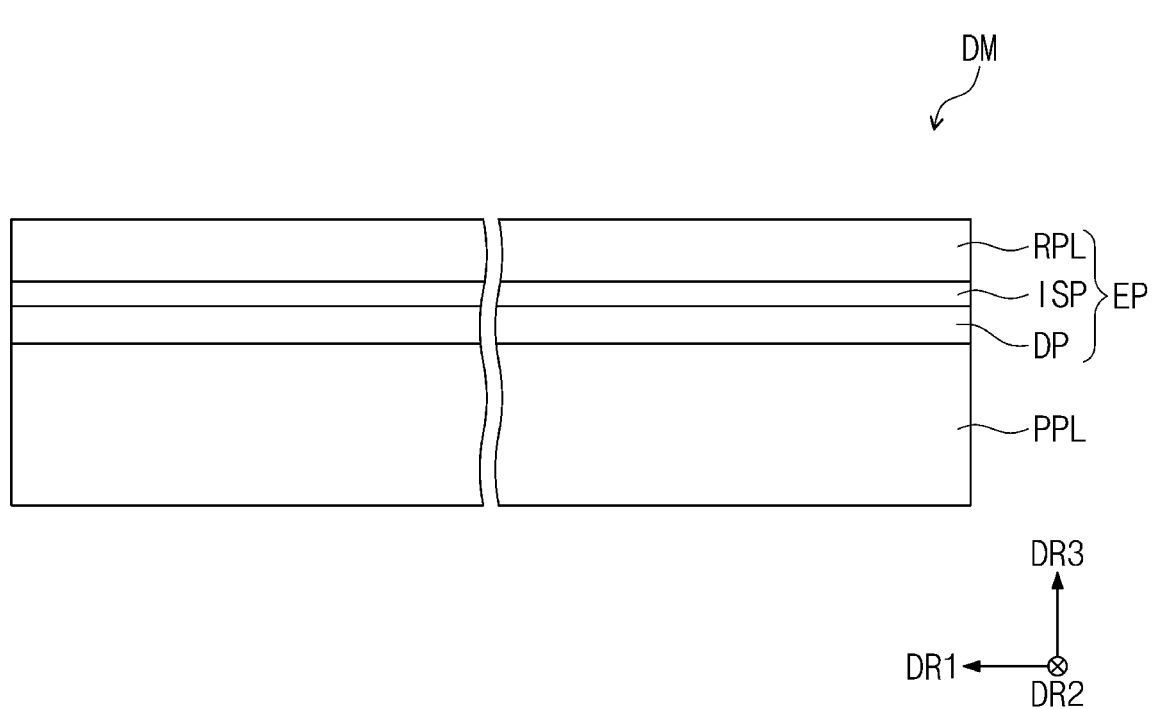
FIG. 4 is a schematic cross-sectional view of a display module illustrated in FIG. 3.

FIG. 4 is a schematic cross-sectional view of the display module DM illustrated in FIG. 3.

FIG. 4 illustrates a cross-sectional view illustrating an example of the display module DM when viewed in the second direction DR2.

Referring to FIG. 4, the display module DM may include an electronic panel EP and a panel protective layer PPL disposed below the electronic panel EP. The electronic panel EP may include a display panel DP, an input sensing part ISP disposed on the display panel DP, and an anti-reflection layer RPL disposed on the input sensing part ISP. The display panel DP may be a flexible display panel. For example, the display panel DP may include a flexible substrate and a plurality of elements disposed on the flexible substrate.

The display panel DP according to an embodiment of the invention may be an emission type display panel, but is not limited thereto. For example, the display panel DP may be an organic light emitting display panel or an inorganic light emitting display panel. An emission layer of the organic light emitting display panel may include an organic light emitting material. An emission layer of the inorganic light emitting display panel may include a quantum dot, a quantum rod, and the like. Hereinafter, the display panel DP is described as an organic light emitting display panel.

The input sensing part ISP as an input sensing layer may include a plurality of sensing parts (not shown) that sense an external input in a capacitive manner. The input sensing part ISP may be disposed directly on the display panel DP when the display module DM is manufactured, without being limited thereto.

The anti-reflection layer RPL may be disposed on the input sensing part ISP. The anti-reflection layer RPL may be directly disposed on the input sensing part ISP when the display module DM is manufactured, without being limited thereto. The anti-reflection layer RPL may be defined as an external light anti-reflection film. The anti-reflection layer RPL may reduce reflectance of external light incident from the display device DD from outside thereof and onto the display panel DP.

For example, the input sensing part ISP may be directly disposed on the display panel DP, and the anti-reflection layer RPL may be directly disposed on the input sensing part ISP, but the embodiment of the invention is limited thereto. For example, the input sensing part ISP may be separately manufactured and attached to the display panel DP using an additional layer such as an adhesive layer, and the anti-reflection layer RPL may be separately manufactured and attached to the input sensing part ISP using another additional layer such as an adhesive layer.

The panel protective layer PPL may be disposed below the display panel DP. The panel protective layer PPL may protect a lower portion of the display panel DP. The panel protective layer PPL may include a flexible plastic material. For example, the panel protective layer PPL may include polyethylene terephthalate (PET).

Figure 5:
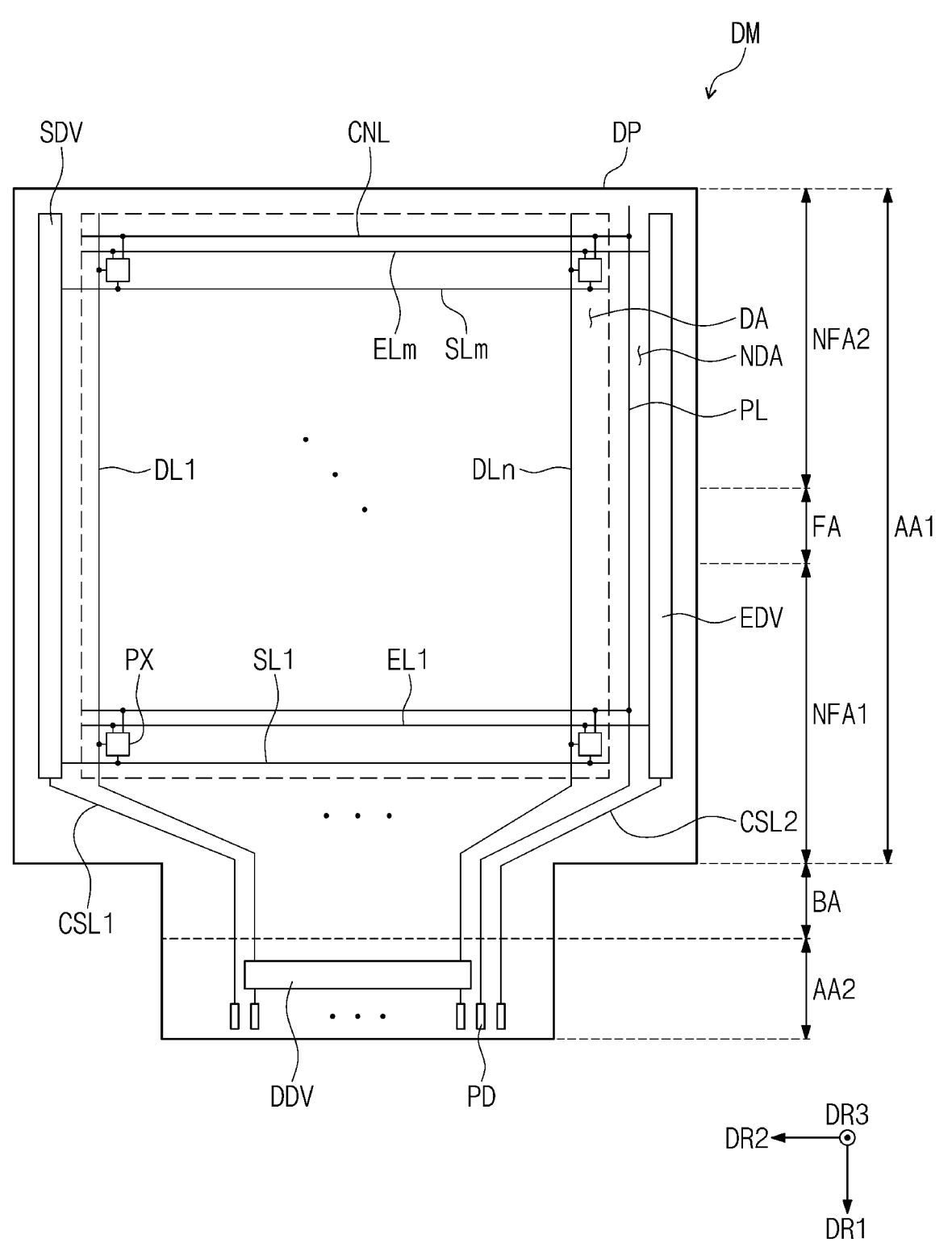
FIG. 5 is a plan view of a display panel illustrated in FIG. 3.

FIG. 5 is a plan view of a display panel DP illustrated in FIG. 3.

Referring to FIG. 5, the display module DM may include a display panel DP, a scan driver SDV, a data driver DDV, and an emission driver EDV.

The display panel DP may include a first area AA1, a second area AA2, and a bending area BA which is between the first area AA1 and the second area AA2. The bending area BA has a major dimension (e.g., a length) which extends in the second direction DR2, and the first area AA1, the bending area BA, and the second area AA2 may be arranged in the first direction DR1.

The first area AA1 may include a display area DA and a non-display area NDA which is adjacent to the display area DA. The non-display area NDA may surround the display area DA. An image IM may be displayed on the display area DA but may not be displayed on the non-display area NDA. The second area AA2 and the bending area BA may be areas on which an image IM is not displayed, and may be considered portions of the non-display area NDA.

Along the second direction DR2, the first area AA1 may include a first non-folding area NFA1, a second non-folding area NFA2, and a folding area FA disposed between the first non-folding area NFA1 and the second non-folding area NFA2.

The display panel DP may include a pixel PX provided in plural including a plurality of pixels PX, a plurality of scan lines SL1 to SLm as signal lines, a plurality of data lines DL1 to DLn as signal lines, a plurality of emission lines EL1 to Elm as signal lines, first and second control lines CSL1 and CSL2 as signal lines, a power line PL as a signal line, a plurality of connection lines CNL, and a pad PD provided in plural including a plurality of pads PD. Here, 'm' and 'n' are natural numbers. The pixels PX may be disposed on or in the display area DA and variously connected to respective signal lines among the scan lines SL1 to SLm, the data lines DL1 to DLn, and the emission lines EL1 to Elm.

A scan driver SDV and an emission driver EDV may be disposed on or in the non-display area NDA. The scan driver SDV and the emission driver EDV may be respectively disposed on the non-display area NDA at opposing sides of the first area AA1, which are opposite to each other in the second direction DR2. The data driver DDV may be disposed on the second area AA2. The data driver DDV may be manufactured in the form of an integrated circuit chip and mounted on the display panel DP, at the second area AA2 thereof.

Although not shown, the bending area BA may be bendable or foldable to be bent. The display device DD (or the display panel DP) which is bent at the bending area BA, may dispose the second area AA2 below the first area AA1. Thus, the data driver DDV mounted in the second area AA2 may be disposed below the first area AA1.

The scan lines SL1 to SLm may lengthwise extend in the second direction DR2 and be connected to the scan driver SDV. The data lines DL1 to DLn may lengthwise extend in the first direction DR1 and be connected to the data driver DDV via extending across the bending area BA. The emission lines EL1 to Elm may extend in the second direction DR2 and be connected to an emission driver EDV.

The power line PL may lengthwise extend in the first direction DR1 and be disposed on the non-display area NDA. The power line PL may be disposed between the display area DA and the emission driver EDV, but is not limited thereto. For example, the power line PL may be disposed between the display area DA and the scan driver SDV.

The power line PL may extend to the second area AA2 via extending across the bending area BA. The power line PL may extend toward a lower end of the second area AA2 when viewed on a plane. The power line PL may receive a driving voltage.

The connection line CNL may be provided in plural including a plurality of connection lines CNL which lengthwise extend in the second direction DR2 and are arranged in the first direction DR1. The connection lines CNL may be connected to the power line PL and the pixels PX. The driving voltage may be applied to the pixels PX through the power line PL and the connection lines CNL, which are connected to each other.

The first control line CSL1 may be connected to the scan driver SDV and extend toward the lower end of the second area AA2, via the bending area BA. The second control line CSL2 may be connected to the emission driver EDV and extend toward the lower end of the second area AA2, via the bending area BA. The data driver DDV may be disposed between the first control line CSL1 and the second control line CSL2.

When viewed on the plane, the pads PD may be disposed adjacent to the lower end of the second area AA2, that is, at a distal end of the second area AA2. The data driver DDV, the power line PL, the first control line CSL1, and the second control line CSL2 may be variously connected to the pads PD.

The data lines DL1 to DLn may be connected to corresponding pads PD, through the data driver DDV. For example, the data lines DL1 to DLn may be connected to the data driver DDV, and the data drivers DDV may be connected to the pads PD, which respectively correspond to the data lines DL1 to DLn.

Although not shown, a printed circuit board may be connected to the pads PD, and a timing controller and a voltage generator may be disposed on the printed circuit board. The timing controller may be manufactured or provided as an integrated circuit chip and mounted on the printed circuit board. The timing controller and the voltage generator may be connected to the pads PD through the printed circuit board.

The timing controller may control operations of the scan driver SDV, the data driver DDV, and the emission driver EDV. The timing controller may generate a scan control signal, a data control signal, and an emission control signal in response to control signals received from the outside. The voltage generator may generate the driving voltage.

The scan control signal may be provided to the scan driver SDV through the first control line CSL1. The emission control signal may be provided to the emission driver EDV through the second control line CSL2. The data control signal may be provided to the data driver DDV. The timing controller may receive image signals from the outside and convert a data format of the image signals to match an interface specification with the data driver DDV and thus provide the converted data format to the data driver DDV.

The scan driver SDV may generate a plurality of scan signals as electrical signals in response to scan control signals as electrical signals. The scan signals may be applied to the pixels PX through the scan lines SL1 to SLm. The scan signals may be sequentially applied to the pixel PX.

The data driver DDV may generate a plurality of data voltages as electrical signals corresponding to image signals as electrical signals, in response to data control signals as electrical signals. The data voltages may be provided to the pixels PX through the data lines DL1 to DLn. The emission driver EDV may generate a plurality of emission signals as electrical signals in response to emission signals as electrical signals. The emission signals may be applied to the pixels PX through the emission lines EL1 to Elm.

The pixels PX may receive the data voltages in response to the scan signals. The pixels PX may emit light having luminance corresponding the data voltages in response to the emission signals to display an image IM. An emission time of the pixels PX may be controlled by the emission signals.

Figure 6:
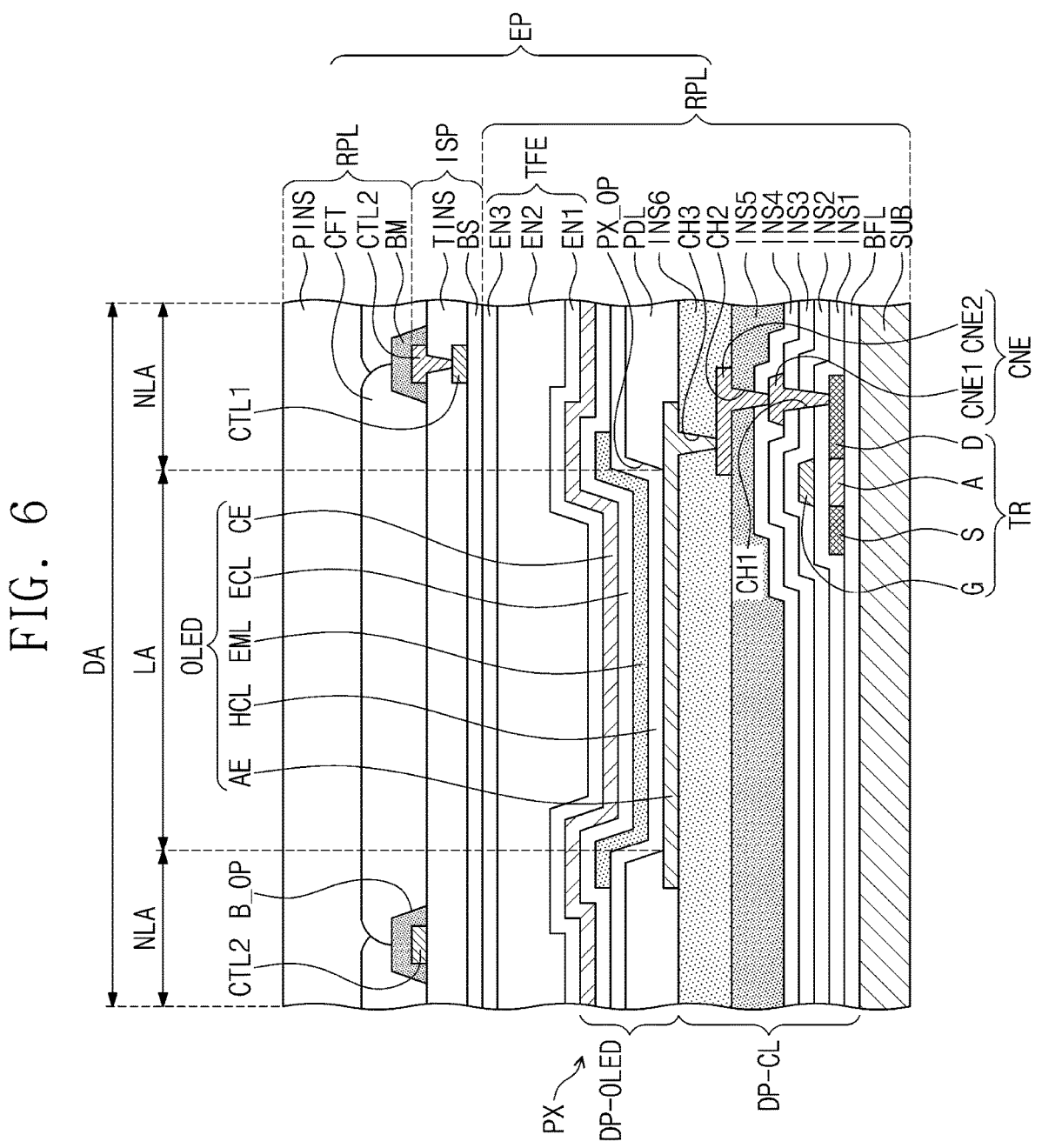
FIG. 6 is a cross-sectional view illustrating an example of a cross-section of the electronic panel corresponding to one pixel of FIG. 5.

FIG. 6 is a view illustrating an example of a cross-section of the electronic panel EP corresponding to one of the pixels PX of FIG. 5.

Referring to FIG. 6, the pixel PX may include a transistor TR and a light emitting element OLED. The light emitting element OLED may include a first electrode AE (or anode), a second electrode CE (or cathode), a hole control layer HCL, an electron control layer ECL, and an emission layer EML.

The transistor TR and the light emitting element OLED may be disposed on the substrate SUB and may be connected to each other. For example, one transistor TR is illustrated, but substantially, the pixel PX may include a plurality of transistors and at least one capacitor, which drive the light emitting element OLED.

The display area DA may include an emission area LA as a light emission area corresponding to each of the pixels PX, and a non-emission area NLA which is adjacent to or around the emission area LA. The light emitting element OLED may be disposed on the emission area LA. A pixel PX may be considered as including portions each of the light emission area and the non-emission area NLA, without being limited thereto.

A buffer layer BFL may be disposed on the substrate SUB, and the buffer layer BFL may be an inorganic layer. A semiconductor pattern may be disposed on the buffer layer BFL. The semiconductor pattern may include polysilicon, amorphous silicon, or metal oxide.

The semiconductor pattern may be doped with an N-type dopant or a P-type dopant. The semiconductor pattern may include a highly doped region and a lowly doped region. The highly doped region may have conductivity greater than that of the lowly doped region to substantially serve as a source electrode and a drain electrode of the transistor TR. The lowly doped region may substantially correspond to an active (or channel) of the transistor.

A source S, an active A as an active region, and a drain D of the transistor TR may be formed from or defined by the semiconductor pattern. A first insulating layer INS1 may be disposed on the semiconductor pattern. The gate G of the transistor TR may be disposed on the first insulating layer INS1. A second insulating layer INS2 may be disposed on the gate G. A third insulating layer INS3 may be disposed on the second insulating layer INS2.

A connection electrode CNE may include a first connection electrode CNE1 and a second connection electrode CNE2 to connect the transistor TR to the light emitting element OLED. The first connection electrode CNE1 may be disposed on the third insulating layer INS3 and be connected to the drain D through (or at) a first contact hole CH1 defined in the first to third insulating layers INS1 to INS3.

A fourth insulating layer INS4 may be disposed on the first connection electrode CNE1. A fifth insulating layer INS5 may be disposed on the fourth insulating layer INS4. The second connection electrode CNE2 may be disposed on the fifth insulating layer INS5. The second connection electrode CNE2 may be connected to the first connection electrode CNE1 through a second contact hole CH2 defined in the fourth and fifth insulating layers INS4 and INS5.

A sixth insulating layer INS6 may be disposed on the second connection electrode CNE2. A layer provided from the buffer layer BFL to the sixth insulating layer INS6 may be defined as a circuit element layer DP-CL or a pixel circuit. Each of the first insulating layer INS1 to the sixth insulating layer INS6 may be an inorganic layer or an organic layer.

The first electrode AE may be disposed on the sixth insulating layer INS6. The first electrode AE may be connected to the second connection electrode CNE2 through a third contact hole CH3 defined in the sixth insulating layer INS6. A pixel defining layer PDL, in which an opening PX_OP for exposing a predetermined portion of the first electrode AE to outside the pixel defining layer PDL is defined, may be disposed on the first electrode AE and the sixth insulating layer INS6. That is, solid portions of the pixel defining layer PDL may define the opening PX_OP therebetween.

The hole control layer HCL may be disposed on the first electrode AE and the pixel defining layer PDL. The hole control layer HCL may include a hole transport layer and a hole injection layer.

The emission layer EML may be disposed on the hole control layer HCL. The emission layer EML may be disposed on an area (e.g., a planar area) corresponding to the opening PX_OP. The emission layer EML may include an organic material and/or an inorganic material. The emission layer EML may emit one of red light, green light, and blue light.

The electron control layer ECL may be disposed on the hole control layer HCL to cover the emission layer EML. The electron control layer ECL may include an electron transport layer and an electron injection layer. A hole control layer HCL and an electron control layer ECL may be commonly disposed on the emission area LA and the non-emission area NLA.

The second electrode CE may be disposed on the electron control layer ECL. The second electrode CE may be commonly disposed in the pixels PX. The collective layer or stacked structure in which the light emitting element OLED is disposed may be defined as the display element layer DP-OLED.

The thin film encapsulation layer TFE as an encapsulation layer may be disposed on the second electrode CE to cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

Each of the first and third encapsulation layers EN1 and EN3 may include an inorganic insulating layer and may protect the pixel PX against moisture/oxygen. The second encapsulation layer EN2 may include an organic insulating layer and may protect the pixel PX against foreign substances such as dust particles.

A first voltage may be applied to the first electrode AE through the transistor TR, and a second voltage having a level lower than that of the first voltage may be applied to the second electrode CE. Holes and electrons injected into the light emitting layer EML may be coupled to each other to form excitons. While the excitons may be transitioned to a ground state, the light emitting element OLED may emit light.

The input sensing part ISP may be disposed on the thin film encapsulation layer TFE. The input sensing part ISP may be manufactured or provided directly on a top surface of the thin film encapsulation layer TFE which is furthest from the circuit element layer DP-CL (or the substrate SUB), without being limited thereto.

A base layer BS may be disposed on the thin film encapsulation layer TFE. The base layer BS may include an inorganic insulating layer. At least one inorganic insulating layer may be provided on the thin film encapsulation layer TFE as the base layer BS.

The input sensing part ISP may include a first conductive pattern CTL1 and a second conductive pattern CTL2 disposed on the first conductive pattern CTL1. The first conductive pattern CTL1 may be disposed on the base layer BS. An insulating layer TINS may be disposed on the base layer BS to cover the first conductive pattern CTL1. The insulating layer TINS may include an inorganic insulating layer or an organic insulating layer. The second conductive pattern CTL2 may be disposed on the insulating layer TINS.

The first and second conductive patterns CTL1 and CTL2 may overlap the non-emission area NLA. Although not shown, the first and second conductive patterns CTL1 and CTL2 may be disposed on the non-emission area NLA between the emission areas LA and may have a mesh shape.

The first and second conductive patterns CTL1 and CTL2 may form sensors of the above-described input sensing part ISP. For example, the mesh-shaped first and second conductive patterns CTL1 and CTL2 may be separated from each other in a predetermined region to form the sensors. A portion of the second conductive pattern CTL2 may be connected to the first conductive pattern CTL1.

An anti-reflection layer RPL may be disposed on the second conductive pattern CTL2. The anti-reflection layer RPL may include a black matrix BM and a plurality of color filters CFT. The black matrix BM may overlap the non-emission area NLA, and the color filters CFT may overlap the emission areas LA, respectively.

The black matrix BM of a light blocking layer may be disposed on the insulating layer TINS to cover the second conductive pattern CTL2. An opening B_OP of the light blocking layer which is overlapping the emission area LA and the opening PX_OP, may be defined in or by the black matrix BM. That is, solid portions of the black matrix layer (e.g., the black matrix BM) may define the opening B_OP therebetween. The black matrix BM may absorb and block light. A width of the opening B_OP in a direction along the input sensing layer (or the encapsulation layer) may be greater than a width of the opening PX_OP which is defined in the pixel defining layer PDL.

The color filters CFT as respective patterns of a color filter layer may be disposed on the insulating layer TINS and the black matrix BM. The color filters CFT may be respectively disposed in the openings B_OP of the light blocking layer. A planarization insulating layer PINS may be disposed on the color filters CFT. The planarization insulating layer PINS may provide a flat top surface to the stacked structure of the display area DA.

When the external light traveling toward the display panel DP along the third direction DR3 is reflected from the display panel DP and provided again to outside the display panel DP, the reflected light may be visually recognized from outside the display panel DP, like a mirror. To prevent this phenomenon, for example, the anti-reflection layer RPL may include a plurality of color filters CFT displaying or emitting the same color as the pixels PX of the display panel DP. The color filters CFT may filter external light with the same colors as the pixels PX. In this case, the external light may not be visually recognized by the user.

However, the embodiment of the invention is not limited thereto, and the anti-reflection layer RPL may include a polarizing film (not shown) to reduce the reflectance of the external light. The polarizing film may be separately manufactured and attached on the input sensing part IS by an adhesive layer. The polarizing film may include a retarder and/or a polarizer.

Figure 7:
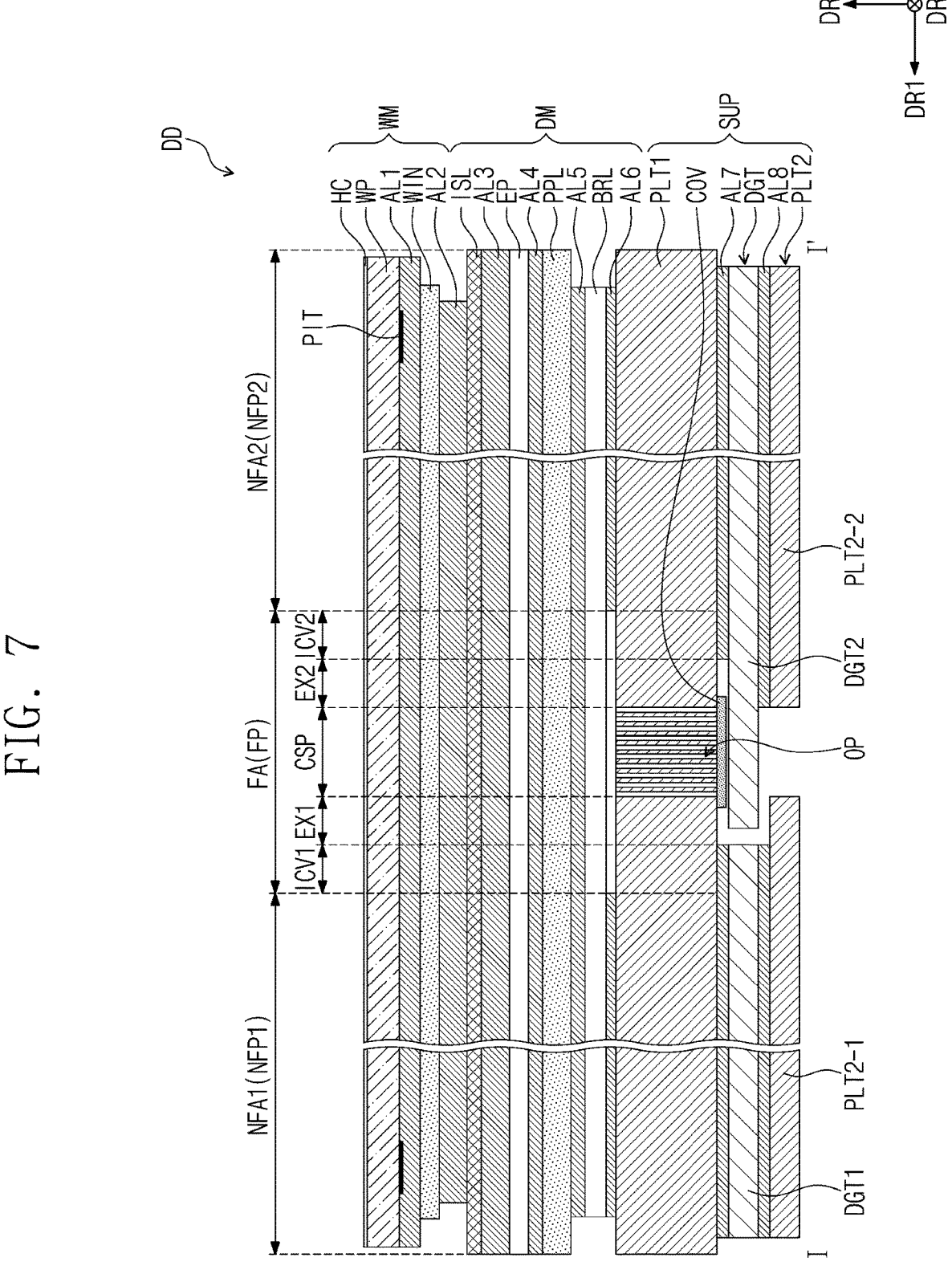
FIG. 7 is a cross-sectional view taken along line I-I' of FIG. 1.

FIG. 7 is a cross-sectional view taken along line I-I' of FIG. 1.

Referring to FIG. 7, the display device DD may include the display module DM, the window module WM disposed on the display module DM, and a support SUP disposed below the display module DM. The window module WM may be disposed on the display module DM to protect the display module DM. The support SUP may support the display module DM below the display module DM.

The display module DM may be a flexible display module. Like the display device DD, the display module DM may include a first non-folding area NFA1, a folding area FA, and a second non-folding area NFA2.

The window module WM may include a window WIN, a window protective layer WP, a hard coating layer HC, and first and second adhesive layers AL1 and AL2. The display module DM may include an electronic panel EP (refer to FIG. 4, for example), an impact absorption layer ISL, a panel protective layer PPL (refer to FIG. 4, for example), a barrier layer BRL, and third to sixth adhesive layers AL3 to AL6. The support SUP may include a digitizer DGT, a first support plate PLT1, a cover layer COV, a second support plate PLT2, and seventh and eighth adhesive layers AL7 and AL8.

Since the configurations of the electronic panel EP and the panel protective layer PPL has been described in detail with reference to FIG. 4, descriptions thereof will be omitted. The impact absorption layer ISL may be disposed on the electronic panel EP. The impact absorption layer ISL may protect the electronic panel EP by absorbing an external impact applied from the upper side of the display device DD and in a direction toward the electronic panel EP. The impact absorption layer ISL may be manufactured in the form of a stretched film.

The impact absorption layer ISL may include a flexible plastic material. The flexible plastic material may be defined as a synthetic resin film. For example, the impact absorption layer ISL may include a flexible plastic material such as polyimide (PI) or polyethylene terephthalte (PET).

The window WIN may be disposed on the impact absorption layer ISL. The window WIN may protect the electronic panel EP from external scratches. The window WIN may have optically transparent properties. The window WIN may include glass. However, the embodiment of the invention is not limited thereto, and the window WIN may include a synthetic resin film.

The window WIN may has a single-layer or multi-layer structure. For example, the window WIN may include a plurality of plastic films bonded to each other by using an adhesive or include a glass substrate and a plastic film, which are bonded to each other by using an adhesive.

The window protective layer WP may be disposed on the window WIN. The window protective layer WP may include a flexible plastic material such as polyimide or polyethylene terephthalate. The hard coating layer HC may be disposed on a top surface of the window protective layer WP. The hard coating layer HC may have a hardness which is greater than a hardness of the window protective layer WP, without being limited thereto.

A printed layer PIT as a light blocking pattern may be disposed on a bottom surface of the window protective layer WP. The printed layer PIT may have a black color, but the color of the printed layer PIT is not limited thereto. The printed layer PIT may be adjacent to an edge of the window protective layer WP, such as the outer edge which is furthest from the folding area FA.

The barrier layer BRL may be disposed below the panel protective layer PPL. Resistance to compression force due to external pressing may increase by the barrier layer BRL. Thus, the barrier layer BRL may serve to prevent deformation of the electronic panel EP from occurring. The barrier layer BRL may include a flexible plastic material such as polyimide or polyethylene terephthalate.

The barrier layer BRL may have a color that absorbs light. For example, the barrier layer BRL may have a black color. In this case, when viewing the display module DM from an upper side of the display module DM, components disposed below the barrier layer BRL may not be visually recognized.

The first adhesive layer AL1 may be disposed between the window protective layer WP and the window WIN. The window protective layer WP and the window WIN may be bonded to each other by the first adhesive layer AL1. The first adhesive layer AL1 may cover the printed layer PIT, such as extending along a cross-sectional profile (or shape) of the printed layer PIT.

The second adhesive layer AL2 may be disposed between the window WIN and the impact absorption layer ISL. The window WIN and the impact absorption layer ISL may be bonded to each other by the second adhesive layer AL2.

The third adhesive layer AL3 may be disposed between the impact absorption layer ISL and the electronic panel EP. The impact absorption layer ISL and the electronic panel EP may be bonded to each other by the third adhesive layer AL3.

A fourth adhesive layer AL4 may be disposed between the electronic panel EP and the panel protective layer PPL. The electronic panel EP and the panel protective layer PPL may be bonded to each other by the fourth adhesive layer AL4.

The fifth adhesive layer AL5 may be disposed between the panel protective layer PPL and the barrier layer BRL. The panel protective layer PPL and the barrier layer BRL may be bonded to each other by the fifth adhesive layer AL5.

The sixth adhesive layer AL6 may be disposed between the barrier layer BRL and the first support plate PLT1. The barrier layer BRL and the first support plate PLT1 may be bonded to each other by the sixth adhesive layer AL6.

The sixth adhesive layer AL6 may overlap the first and second non-folding areas NFA1 and NFA2 and may not overlap the folding area FA. The sixth adhesive layer AL6 may be disconnected at the folding area FA, to define portions of the layer which are spaced apart from each other at the folding area FA. That is, the sixth adhesive layer AL6 may not be disposed on the folding area FA. As not being disposed at an area or location, a component or layer may be adjacent to the area or location, and may even be spaced apart from the area or location in a direction along a plane.

Each of the first to sixth adhesive layers AL1 to AL6 may include a transparent adhesive such as a pressure sensitive adhesive (PSA) or an optically clear adhesive (OCA), but the type of adhesive is not limited thereto.

The first support plate PLT1 may be disposed below the display module DM to support the display module DM. The first support plate PLT1 may be disposed below the barrier layer BRL.

The first support plate PLT1 may have rigidity greater than that of the display module DM. The first support plate PLT1 may include a non-metal material. For example, the first support plate PLT1 may include a reinforcing fiber composite. For example, the reinforcing fiber composite may be carbon fiber reinforced plastic (CFRP) or glass fiber reinforced plastic (GFRP).

The first support plate PLT1 may include a reinforcing fiber composite so as to be lightweight. The first support plate PLT1 according to an embodiment may include a reinforcing fiber composite material, and thus, have a light weight compared to the metal support plate using a metal material and have a modulus and strength similar to that of the metal support plate.

In addition, since the first support plate PLT1 may include the reinforcing fiber composite, the shape processing of the first support plate PLT1 may be easier compared to the metal support plate. For example, the first support plate PLT1 including the reinforcing fiber composite may be more easily processed through a laser process or a micro-blast process in forming or providing of the first support plate PLT1.

A plurality of openings OP may be defined in a portion of the first support plate PLT1 which overlaps or corresponds to the folding area FA. That is, solid portions of the first support plate PLT1 may define the openings OP therebetween. The openings OP may be defined to pass through portions of the first support plate PLT1 in the third direction DR3. In an embodiment, the openings OP may extend through an entirety of the thickness of the first support plate PLT1 to be open at upper and lower surfaces thereof, or extend into a partial thickness of the first support plate PLT1 to be open at one or both surfaces among the upper and lower surfaces. The openings OP may be formed through the above-described laser process or micro-blast process.

The first support plate PLT1 may include a first non-folding part NFP1, a folding part FP, and a second non-folding part NFP2. The folding part FP may be disposed between the first non-folding part NFP1 and the second non-folding part NFP2, and may connect the first non-folding part NFP1 to the second non-folding part NFP2. The first non-folding part NFP1, the folding part FP, and the second non-folding part NFP2 may be arranged in the first direction DR1. The openings OP may be defined in or by the folding part FP.

When viewed on a plane, the first non-folding part NFP1 may overlap the first non-folding area NFA1, the folding part FP may overlap the folding area FA, and the second non-folding part NFP2 may overlap the second non-folding area NFA2.

The folding part FP may include a curved portion CSP, a first extension portion EX1, a second extension portion EX2, a first inverse curvature portion ICV1, and a second inverse curvature portion ICV2. The openings OP may be defined in the curved portion CSP.

The curved portion CSP may be disposed between the first extension portion EX1 and the second extension portion EX2. The first extension portion EX1 may be disposed between the curved portion CSP and the first inverse curvature portion ICV1. The second extension portion EX2 may be disposed between the curved portion CSP and the second inverse curvature portion ICV2. The first inverse curvature portion ICV1 may be disposed between the first extension portion EX1 and the first non-folding part NFP1. The second inverse curvature portion ICV2 may be disposed between the second extension portion EX2 and the second non-folding part NFP2.

The curved portion CSP may be bendable to be bent at a predetermined curvature, and the first and second inverse curvature portions ICV1 and ICV2 may be bendable to be bent in a direction opposite to the curved portion CSP, to be symmetrical to each other. A shape of the folding part FP will be illustrated in detail in FIG. 11 below.

As the openings OP are defined in the curved portion CSP, flexibility of the curved portion CSP may be improved. As the curved portion CSP having the improved flexibility is easily bent, the first support plate PLT1 may be easily folded at the folding area FA. That is, the first support plate PLT1 may be foldable together with the display panel DP (or display module DM), about a folding axis FX.

The cover layer COV may be disposed below the first support plate PLT1. The cover layer COV may be disposed below the folding part FP to cover the openings OP. When viewed on the plane, the cover layer COV may overlap the folding part FP and may not overlap the first and second non-folding parts NFP1 and NFP2.

The cover layer COV may overlap the curved portion CSP and may not overlap the first and second inverse curvature portions ICV1 and ICV2. The cover layer COV may be in contact with a bottom surface of the solid portions of the first support plate PLT1, at the folding part FP in which the openings OP are formed. As being in contact, components or layers may form an interface therebetween.

The cover layer COV may have an elastic modulus less than an elastic modulus of the first support plate PLT1. For example, the cover layer COV may include thermoplastic polyurethane or rubber, but the material of the cover layer COV is not limited thereto. The cover layer COV may be manufactured or provided in the form of a sheet and attached to the first support plate PLT1.

The digitizer DGT may be disposed below the first support plate PLT1. The cover layer COV may be disposed between the first support plate PLT1 and the digitizer DGT. The cover layer COV may be spaced apart from a top surface of the digitizer DGT and may not be attached to the digitizer DGT. That is, the cover layer COV and the digitizer DGT may move separately or individually from each other, since they are unattached to each other.

The digitizer DGT may be a device that receives location information instructed by the user, such as on or at the display surface DS. The digitizer DGT may be implemented in an electromagnetic manner (or electromagnetic resonance manner). For example, the digitizer DGT may include a digitizer sensor substrate (not shown) including a plurality of coils. However, the embodiment of the invention is not limited thereto, and the digitizer DGT may be implemented as an active electrostatic type.

When an input tool such as a pen is moved on the display device DD, the pen may be driven by an alternating current (AC) signal to generate vibrating magnetic fields, and the vibrating magnetic fields may induce a signal in the coil of the digitizer DGT. The position of the pen along the display device DD (such as along the display surface DS) may be detected through the signal induced in the coil. The digitizer DGT may sense the position of the pen by detecting an electromagnetic change generated by the approach of the pen, at a location along the display device DD.

If the first support plate PLT1 disposed on the digitizer DGT and adjacent to the digitizer DGT includes a metal, sensitivity of the digitizer DGT may be lowered by the metal. For example, when a signal (e.g., an electrical signal) transmitted on the display device DD is blocked due to a signal interference by the metal support plate, the digitizer DGT may not operate normally. However, in an embodiment of the invention, since the first support plate PLT1 disposed on the digitizer DGT includes a non-metal reinforcing fiber composite, the digitizer DGT may operate normally.

The digitizer DGT may be disposed below the first support plate PLT1 and separated into two portions of a digitizer layer. The digitizer DGT may include a first digitizer DGT1 disposed below the first support plate PLT1 and a second digitizer DGT2 disposed below the first support plate PLT1 and spaced apart from the first digitizer in the first direction DR1. The first digitizer DGT1 and the second digitizer DGT2 within the digitizer layer may be connected to each other by a flexible circuit board FPCB, and this configuration will be described in detail below. The first digitizer DGT1 and the second digitizer DGT2 may be coplanar with each other.

The first digitizer DGT1 may be disposed below the first non-folding part NFP1. The first digitizer DGT1 may be disposed below the first non-folding part NFP1 to extend to the first inverse curvature portion ICV1. Thus, when viewed on the plane, the first digitizer DGT1 may overlap the first non-folding part NFP1 and the first inverse curvature portion ICV1.

The second digitizer DGT2 may be disposed below the second non-folding part NFP2 and the folding part FP. Specifically, the second digitizer DGT2 may be disposed below the second non-folding part NFP2 to extend below the second inverse curvature portion ICV2, the second extension portion EX2, the curved portion CSP, and the first extension portion EX1. Thus, when viewed on the plane, the second digitizer DGT2 may overlap the second non-folding part NFP2, the second inverse curvature portion ICV2, the second extension portion EX2, the curved portion CSP, and the first extension portion EX1.

Since the second digitizer DGT2 extends from a lower side of the second non-folding part NFP2 to a lower side of the first extension portion EX1, a length of the second digitizer DGT2 in the first direction DR1 may be greater than a length of the first digitizer DGT1.

The seventh adhesive layer AL7 may be disposed between the first digitizer DGT1 and the first non-folding part NFP1 and between the second digitizer DGT2 and the second non-folding part NFP2. The first digitizer DGT1 may be attached to the first non-folding part NFP1 at a first portion of the seventh adhesive layer AL7, and the second digitizer DGT2 may be attached to the second non-folding part NFP2 by a second portion of the seventh adhesive layer AL7. The cover layer COV may be coplanar with the seventh adhesive layer AL7.

The seventh adhesive layer AL7 may be further disposed between the first inverse curvature portion ICV1 and the first digitizer DGT1 and between the second inverse curvature portion ICV2 and the second digitizer DGT2. Thus, the first digitizer DGT1 may be attached to the first inverse curvature portion ICV1, and the second digitizer DGT2 may be attached to the second inverse curvature portion ICV2, by respective portions of the seventh adhesive layer AL7.

The seventh adhesive layer AL7 may be disconnected at the folding area FA, may not be disposed between the curved portion CSP and the second digitizer DGT2 and between the first and second extension portions EX1 and EX2 and the second digitizer DGT2. Thus, the second digitizer DGT2 may not be attached to (e.g., may be unattached from) the curved portion CSP and the first and second extension portions EX1 and EX2 of the first support plate PLT1.

The second support plate PLT2 may be disposed below the digitizer DGT. The second support plate PLT2 may include a second-1 support plate PLT2-1 as a first plate disposed below the first digitizer DGT1 and a second-2 support plate PLT2-2 as a second plate disposed below the second digitizer DGT2. The second-1 support plate PLT2-1 and the second-2 support plate PLT2-2 may be coplanar with each other. When viewed on the plane, the curved portion CSP may be disposed between the second-1 support plate PLT2-1 and the second-2 support plate PLT2-2.

The second-1 support plate PLT2-1 may be disposed below the first non-folding part NFP1 to extend below the first inverse curvature portion ICV1 and the first extension portion EX1. That is, when viewed on the plane, the second-1 support plate PLT2-1 may overlap the first non-folding part NFP1, the first inverse curvature portion ICV1, and the first extension portion EX1. The second-1 support plate PLT2-1 extends further than an inner side surface of the first digitizer DGT1 which is closest to the folding area FA and faces the inner side surface of the second digitizer DGT2 which is closest to the first digitizer DGT1.

The second-2 support plate PLT2-2 may be disposed below the second non-folding part NFP2 to extend below the second inverse curvature portion ICV2 and the second extension portion EX2. That is, when viewed on the plane, the second-2 support plate PLT2-2 may overlap the second non-folding part NFP2, the second inverse curvature portion ICV2, and the second extension portion EX2. Here, the second digitizer DGT2 extends further than an inner side surface of the second-2 support plate PLT2-2, at the folding area FA.

The first digitizer DGT1 may be disposed between the first support plate PLT1 and the second-1 support plate PLT2-1, along the thickness direction. For example, the first digitizer DGT1 may be disposed between the first non-folding part NFP1 and the second-1 support plate PLT2-1.

The second digitizer DGT2 may be disposed between the first support plate PLT1 and the second-2 support plate PLT2-2 to extend between the first support plate PLT1 and the second-1 support plate PLT2-1. For example, the second digitizer DGT2 may be disposed between the second non-folding part NFP2 and the second-2 support plate PLT2-2 to extend below the folding part FP. The second digitizer DGT2 may extend between the first support plate PLT1 and the second-1 support plate and may be adjacent to one side of the first digitizer DGT1.

The eighth adhesive layer AL8 may be disposed between the first digitizer DGT1 and the second-1 support plate PLT2-1 and between the second digitizer DGT2 and the second-2 support plate PLT2-2. The first digitizer DGT1 may be attached to the second-1 support plate PLT2-1, and the second digitizer DGT2 may be attached to the second-2 support plate PLT2-2, by the eighth adhesive layer AL8.

A portion or planar area of the second digitizer DGT2 may not be attached to the second-1 support plate PLT2-1. For example, when viewed on the plane, the eighth adhesive layer AL8 may not overlap the first extension portion EX1. In an area overlapping the first extension portion EX1, the eighth adhesive layer AL8 may not be disposed between the second digitizer DGT2 and the second-2 support plate PLT2-2.

Each of the seventh and eighth adhesive layers AL7 and AL8 may include a pressure sensitive adhesive (PSA).

Figure 8:
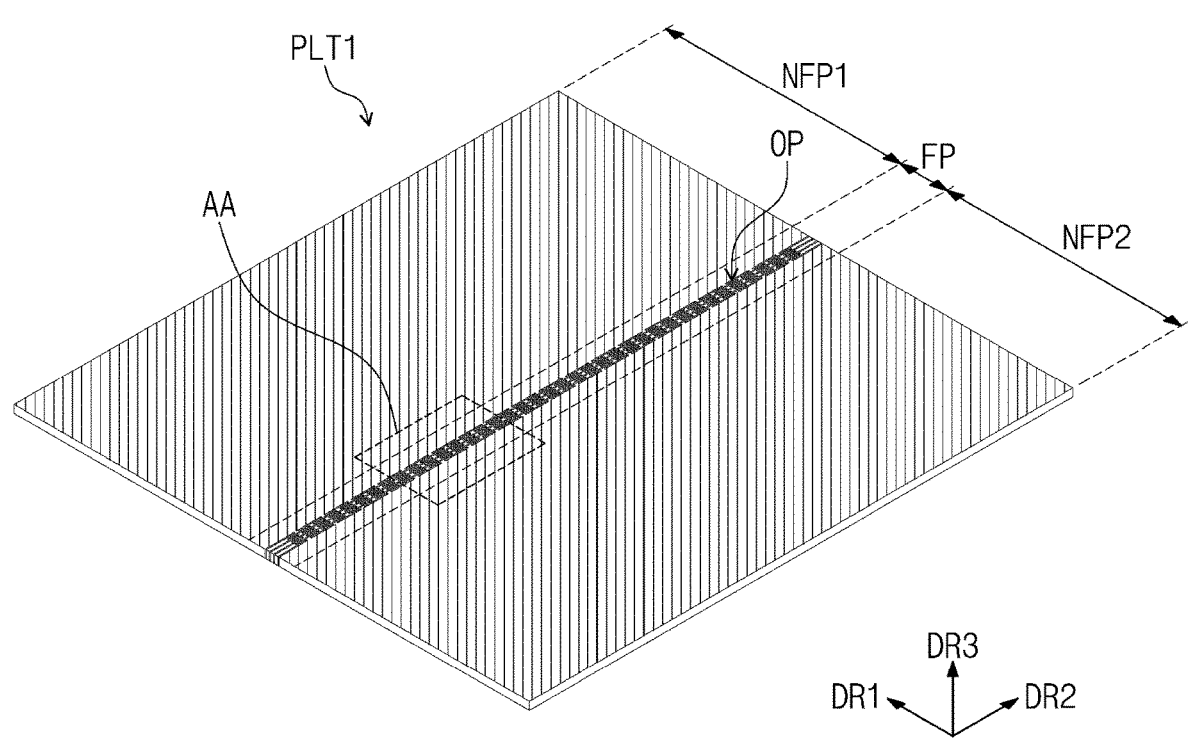
FIG. 8 is a perspective view illustrating a first support plate of FIG. 7.
Figure 9:
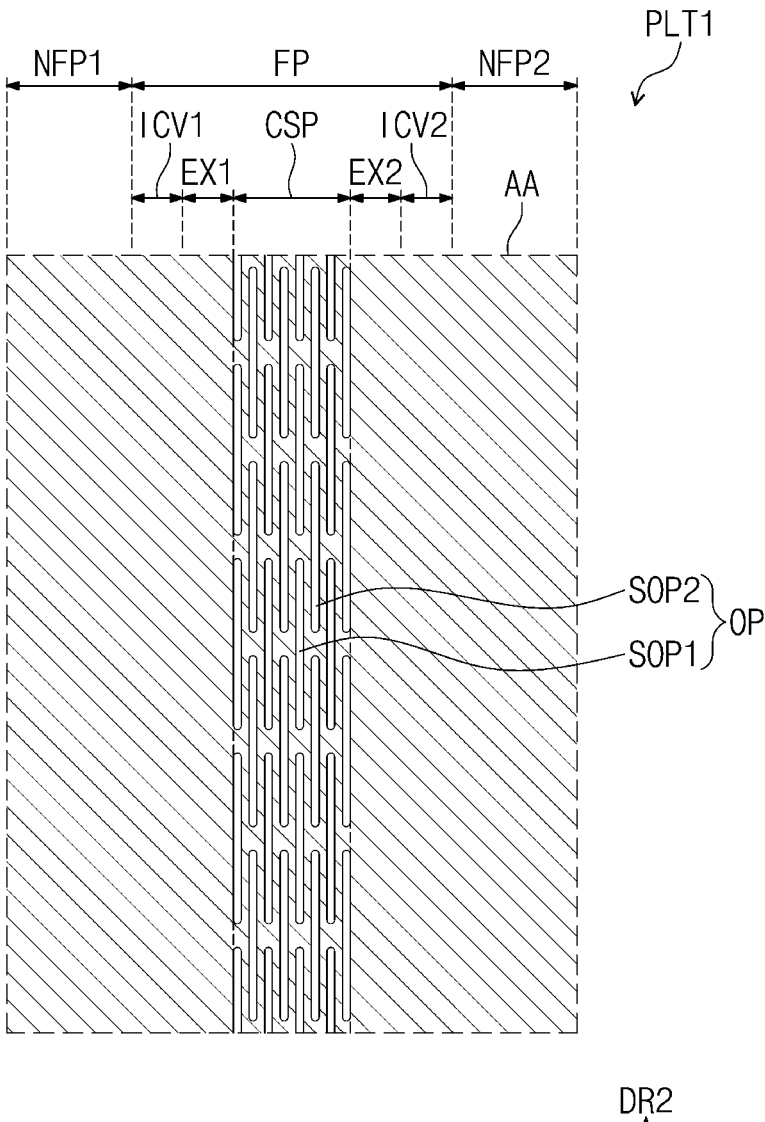
FIG. 9 is an enlarged view illustrating area AA of FIG. 8.

FIG. 8 is a perspective view illustrating the first support plate PLT1 of FIG. 7. FIG. 9 is an enlarged view illustrating area AA of FIG. 8.

Referring to FIGS. 8 and 9, a grid pattern may be disposed on or defined in the folding part FP. For example, a plurality of openings OP may be defined in the folding part FP. Specifically, the openings OP may be defined in the curved portion CSP. The openings OP may not be defined in the first and second extension portions EX1 and EX2 and the first and second inverse curvature portions ICV1 and ICV2. The openings OP may be arranged in a predetermined rule. The openings OP may be arranged in a grid shape to provide the grid pattern at the folding part FP.

Since the openings OP are defined in the curved portion CSP, an area of material (e.g., the solid portion of the first support plate PLT1) at the curved portion CSP may be reduced, and thus, rigidity of the first support plate PLT1 at the curved portion CSP may be lowered. When the openings OP are defined in the curved portion CSP, flexibility of the curved portion CSP may be higher than when the openings OP are not defined. Thus, the curved portion CSP may be more easily bent, and thus, the folding part FP may be easily folded.

Referring to FIG. 9, as described with reference to FIG. 7, the folding part FP may include a curved portion CSP, a first extension portion EX1, a second extension portion EX2, a first inverse curvature portion ICV1, and a second inverse curvature portion ICV2. The curved portion CSP, the first extension portion EX1, the second extension portion EX2, the first inverse curvature portion ICV1, and the second inverse curvature portion ICV2 may be arranged in the first direction DR1.

For example, the curved portion CSP may be disposed at a central portion of the folding part FP. The first inverse curvature portion ICV1 may be defined as a portion of the folding part FP, which is adjacent to (or closest to) the first non-folding part NFP1. The second inverse curvature portion ICV2 may be defined as a portion of the folding part FP, which is adjacent to (or closest to) the second non-folding part NFP2. The first extension portion EX1 may extend from the curved portion CSP to the first inverse curvature portion ICV1. The second extension portion EX2 may extend from the curved portion CSP to the second inverse curvature portion ICV2.

The openings OP may be defined in the curved portion CSP and arranged in the first direction DR1 and the second direction DR2. The openings OP may extend to be longer in the second direction DR2 (e.g., a major dimension of a length) than in the first direction DR1. That is, the openings OP may extend in a direction parallel to the above-described folding axis FX.

The openings OP may include a group of openings OP arranged along the second direction DR2, in a column. A plurality of groups may be arranged along the first direction DR1. The openings OP may include first sub-openings SOP1 arranged in an h-th column and second sub-openings SOP2 arranged in an (h+1)-th column. Where 'h' is a natural number. The column may correspond to an extension direction along the second direction DR2. The second sub-openings SOP2 may be adjacent to the first sub-openings SOP1 in the first direction DR1. The first sub-openings SOP1 may be disposed alternately with the second sub-openings SOP2, along the first direction DR1. That is, spaces or gaps between openings OP in a group of openings OP, may be staggered along the first direction DR1.

Figure 10:
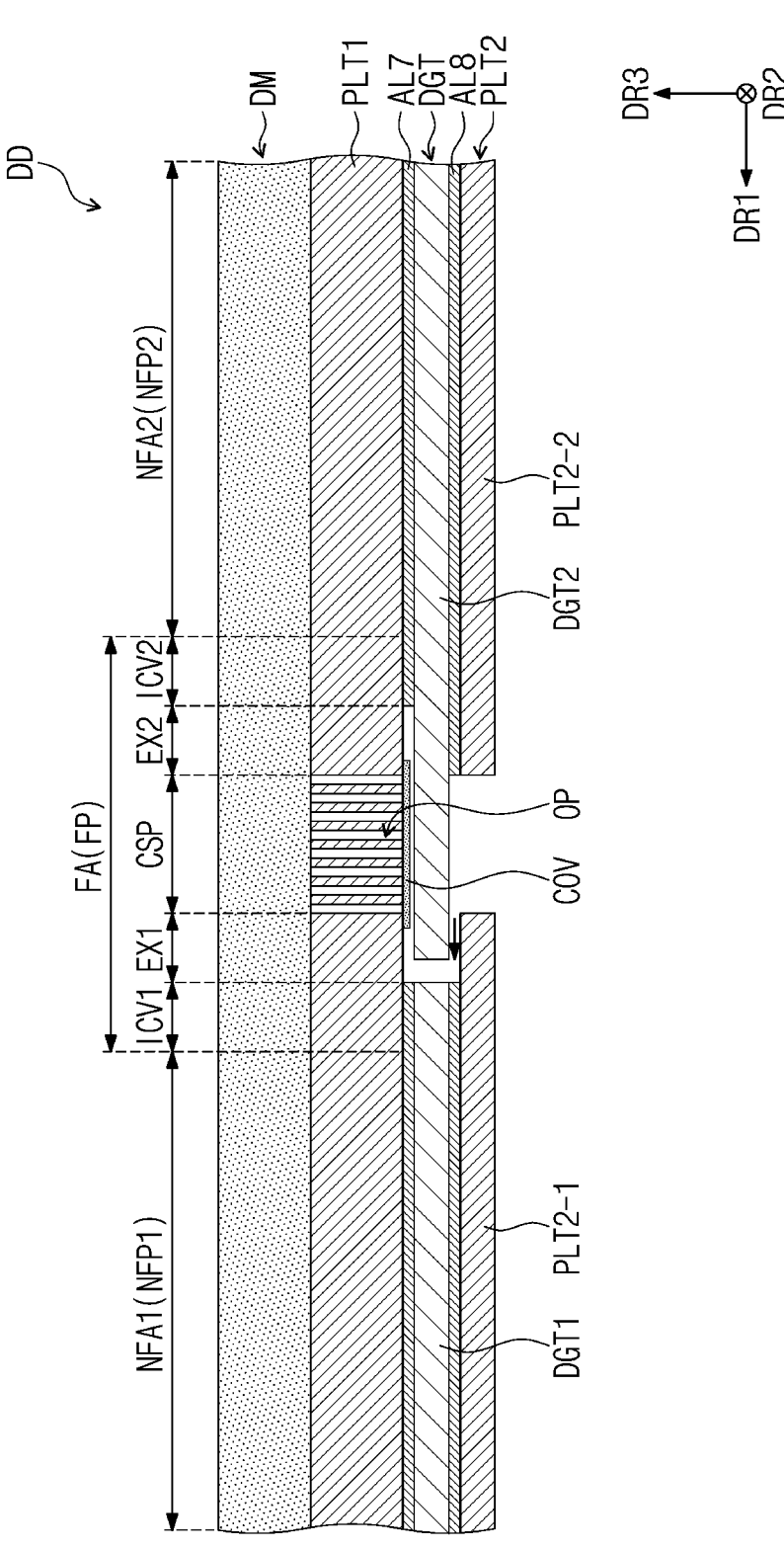
FIG. 10 is a cross-sectional view illustrating an unfolded state of the display device of FIG. 7.
Figure 11:
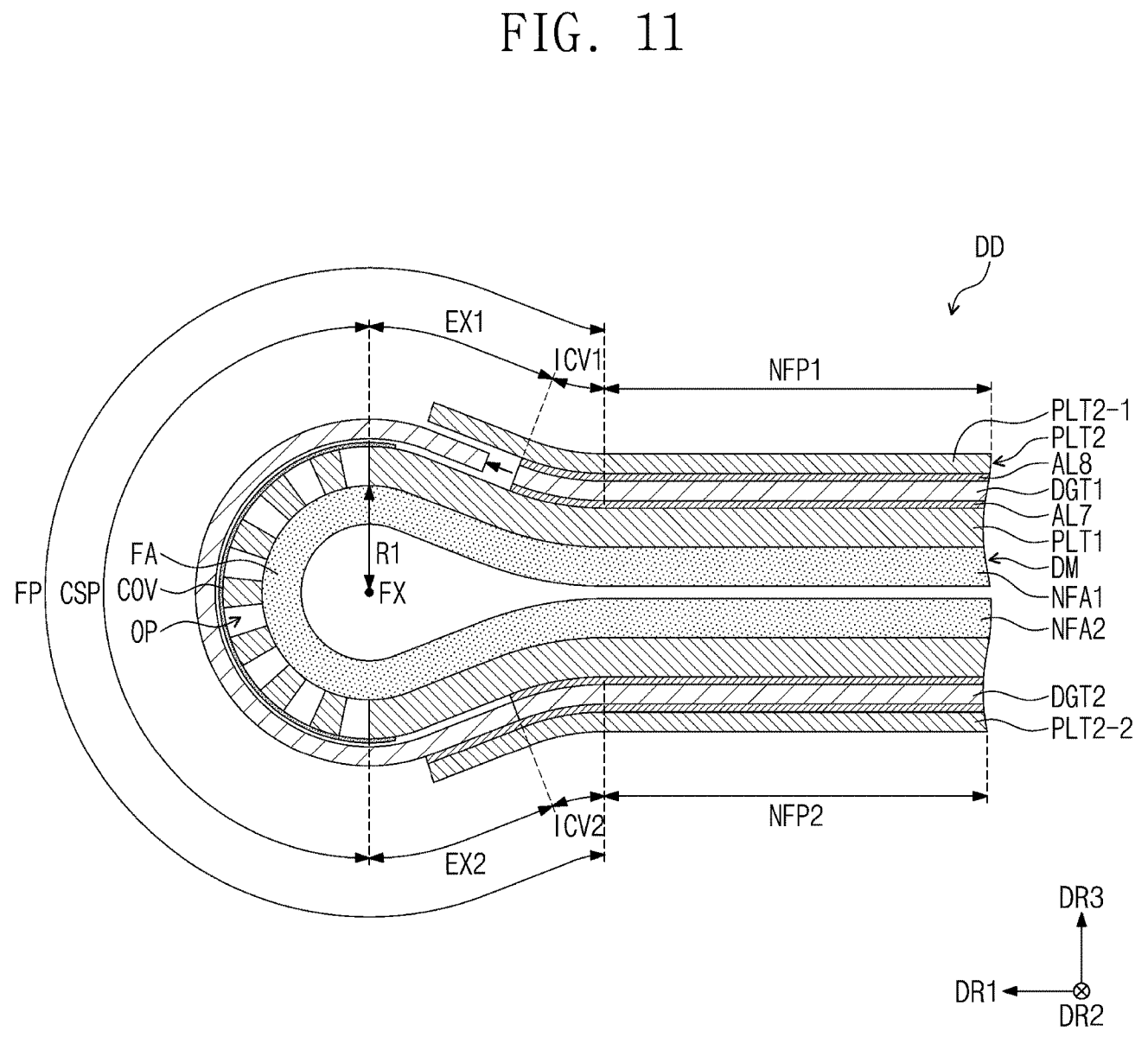

FIG. 10 is a schematic view illustrating an unfolded state of the display device DD of FIG. 7. FIG. 11 is a view illustrating a folded state of the display device DD of FIG. 10.

Referring to FIGS. 10 and 11, the display module DM is illustrated as a single layer, and the window module WM is omitted, for convenience of explanation.

Referring to FIGS. 10 and 11, the display device DD may be folded or unfolded. In FIG. 10, the display device DD may be unfolded or flat in the second direction DR2 and thus be in an unfolded state. In FIG. 11, the display device DD may be in a folded state as being bent around the folding axis FX. The display device DD may be changed from the flat (first) state of FIG. 10 to the folded (second) state of FIG. 11 or changed from the second state to the first state. The folding operation may be performed repeatedly.

Since the display module DM is a flexible display module, the folding area FA of the display module DM may be easily bent. Since the openings OP are defined in the first support plate PLT1, the folding part FP may be easily bent by including the openings OP. The display module DM may be foldable together with the first support plate PLT1 so that the display module DM is folded by the first support plate PLT1. The display device DD may be in-folded so that portions of the first non-folding area NFA1 and the second non-folding area NFA2 face each other, as shown in FIG. 11.

When the folding part FP is folded, the curved portion CSP may be bent at a predetermined curvature. The curved portion CSP may be bent to define a first curvature radius R1. The first inverse curvature portion ICV1 may be bent in a direction opposite to the curved portion CSP. The second inverse curvature portion ICV2 may be bent in a direction opposite to the curved portion CSP. The second inverse curvature portion ICV2 may have a shape symmetrical to that of the first inverse curvature portion ICV1, with respect to the curved portion CSP. In an embodiment, for example, the first support plate PLT1 is foldable and unfoldable together with the digitizer DGT, at the folding part FP. The first support plate PLT1 includes a curvable portion (e.g., the curved portion CSP) which defines the plurality of openings OP of the folding part FP, a first extension portion EX1 and a second extension portion EX2 respectively extending from the curvable portion in opposite directions from the curvable portion, a first inverse curvature portion ICV1 which is between the first extension portion EX1 and the first non-folding part NFP1, and a second inverse curvature portion ICV2 which is between the second extension portion EX2 and the second non-folding part NFP2. The first support plate PLT1 which is folded at the folding part FP includes the curvable portion curved in a curved direction, together with each of the first inverse curvature portion ICV1 and the second curvature portion ICV2 bent in a direction opposite to the curved direction of the curvable portion.

When the folding part FP is folded, a distance between the first non-folding part NFP1 and the second non-folding part NFP2 in the third direction DR3, may be less than twice (for example, diameter) the first curvature radius R1 in the third direction DR3. According to this folded state, the display device DD which is folded includes the first support plate PLT1 having a dumbbell shape. The display module DM may be folded into the dumbbell shape by folding of the first support plate PLT1 into the dumbbell shape.

The first digitizer DGT1 and the second digitizer DGT2, which are attached to the first inverse curvature portion ICV1 and the second inverse curvature portion ICV2 respectively, may be bent into shapes corresponding to shapes of the first inverse curvature portion ICV1 and the second inverse curvature portion ICV2. The second-1 support plate PLT2-1 and the second-2 support plate PLT2-2, which are attached to the first digitizer DGT1 and the second digitizer DGT2, may be bent into shapes corresponding to the shapes of the first digitizer DGT1 and the second digitizer DGT2.

One side (e.g., the inner side surface) of the second digitizer DGT2 may be disposed between the first extension portion EX1 of the first support plate PLT1 and the second-1 support plate PLT2-1 of the second support plate PLT2. Along the thickness direction in the unfolded state or along a radial direction in the folded state, for example, an inner end portion of the second digitizer DGT2 is overlapped by an inner end portion of the second-1 support plate PLT2-1. When the first support plate PLT1 is folded and unfolded, the second digitizer DGT2 may not move outside the second-1 support plate PLT2-1, and portions of the second support plate PLT2, the digitizer DGT and the first support plate PLT1 may remain in order from the outside of the display device DD which is both folded (FIG. 11) and unfolded (FIG. 10). That is, one side of the second digitizer DGT2 may be accommodated in a space between the first extension portion EX1 and the second-1 support plate PLT2-1.

When the first support plate PLT1 is folded at the folding part FP, one side of the second digitizer DGT2 may be disposed between the first extension portion EX1 and the second-1 support plate PLT2-1. Thus, the second-1 support plate PLT2-1 may serve to support one side of the second digitizer DGT2.

The second-1 support plate PLT2-1 may be disposed to cover one side of the second digitizer DGT2, thereby serving to hold the second digitizer DGT2 so that the second digitizer DGT2 is not separated from the outside. According to this structure, when the first support plate PLT1 is folded, the second digitizer DGT2 may be bent along the curved portion CSP while still being supported by and held to an inside of the display device DD by an extended inner end portion of the second support plate PLT2 (e.g., the end portion of the second-1 support plate PLT2-1).

When the first support plate PLT1 is folded and unfolded, one side of the second digitizer DGT2 may move in directions away from and toward the first digitizer DGT1, along the first support plate PLT1 as indicated by the respective arrows in FIGS. 10 and 11, between the first extension portion EX1 and the second-1 support plate PLT2-1. One side (e.g., an inner side surface) of the second digitizer DGT2 may face one side (e.g., an inner side surface) of the first digitizer DGT1, in the direction along the first support plate PLT1, at the folding part FP of the first support plate PLT1. In an embodiment, the digitizer DGT and the first support plate PLT1 are foldable and unfoldable together with each other, where folding of the first support plate PLT1 (FIG. 11, for example) slides the second digitizer DGT2 away from the first digitizer DGT1, in a direction along the first support plate PLT1, and unfolding of the first support plate PLT1 (FIG. 10, for example) slides the second digitizer DGT2 toward the first digitizer DGT1, in the direction along the first support plate PLT1.

When the first support plate PLT1 is converted from the folded state to the unfolded state, since the second digitizer DGT2 is bent along the curved portion CSP, one side of the second digitizer DGT2 may move away from one side of the first digitizer DGT1 between the first extension portion EX1 and the second-1 support plate PLT2-1.

When the first support plate PLT1 is converted from the unfolded state to the folded state, since the second digitizer DGT2 is unfolded to be flat, one side of the second digitizer DGT2 may move closer to one side the first digitizer DGT1 between the first extension portion EX1 and the second-1 support plate PLT2-1. That is, when the first support plate PLT1 is folded and unfolded, the second digitizer DGT2 may be slidably disposed relative to the first digitizer DGT1 to be slid and move between the second-1 support plate PLT2-1 and the first support plate PLT1.

In the embodiment of the invention, since the second digitizer DGT2 is disposed between the first support plate PLT1 and the second-1 support plate PLT2-1, when the first support plate PLT1 is folded, the second digitizer DGT2 may be easily bent along the folding part FP to have a curved shaped corresponding to the curved portion CSP, without being flat or unfolded.

Figure 12:
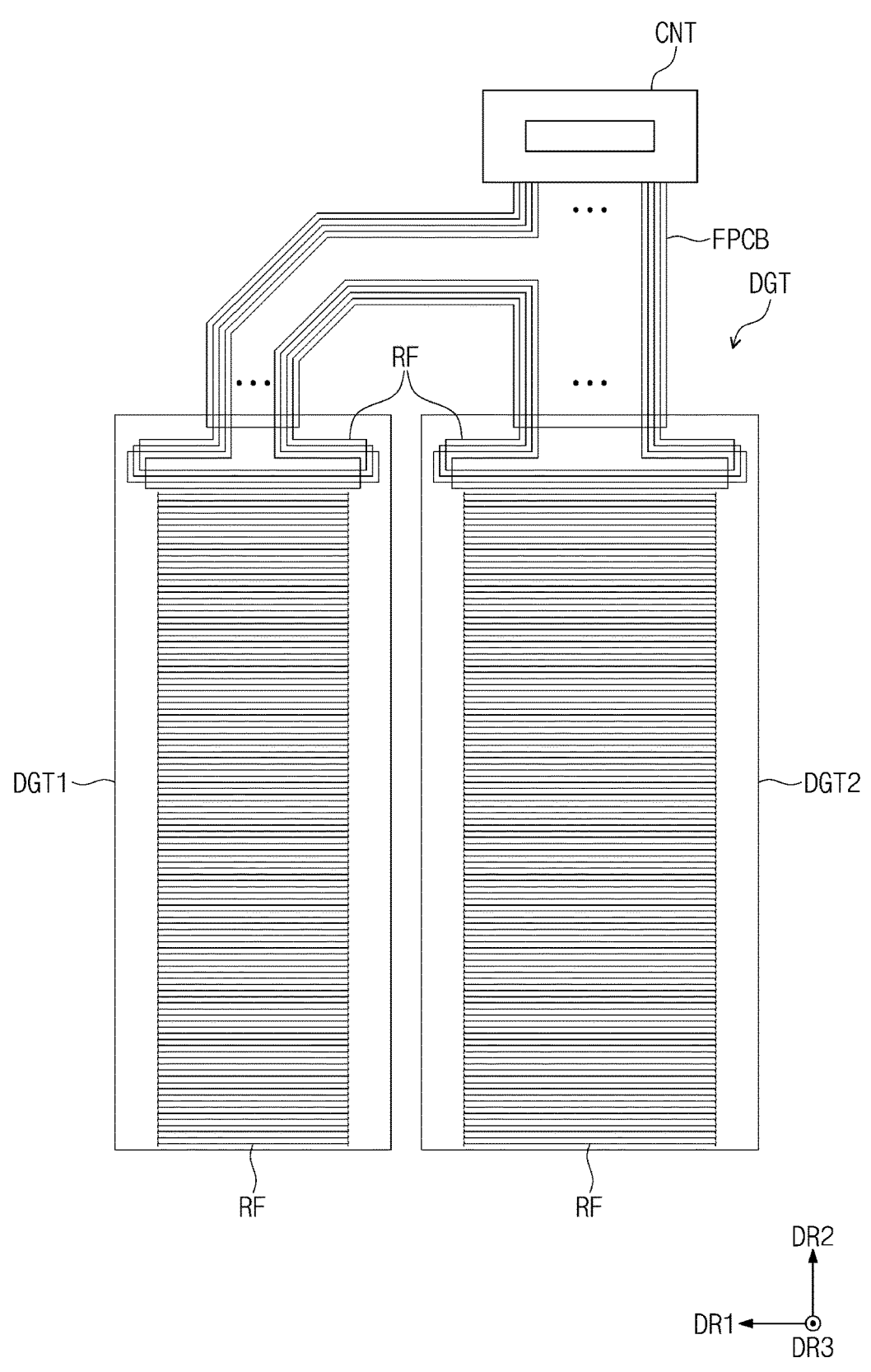
FIG. 12 is a plan view illustrating first sensing coils of a digitizer illustrated in FIG. 7.
Figure 13:
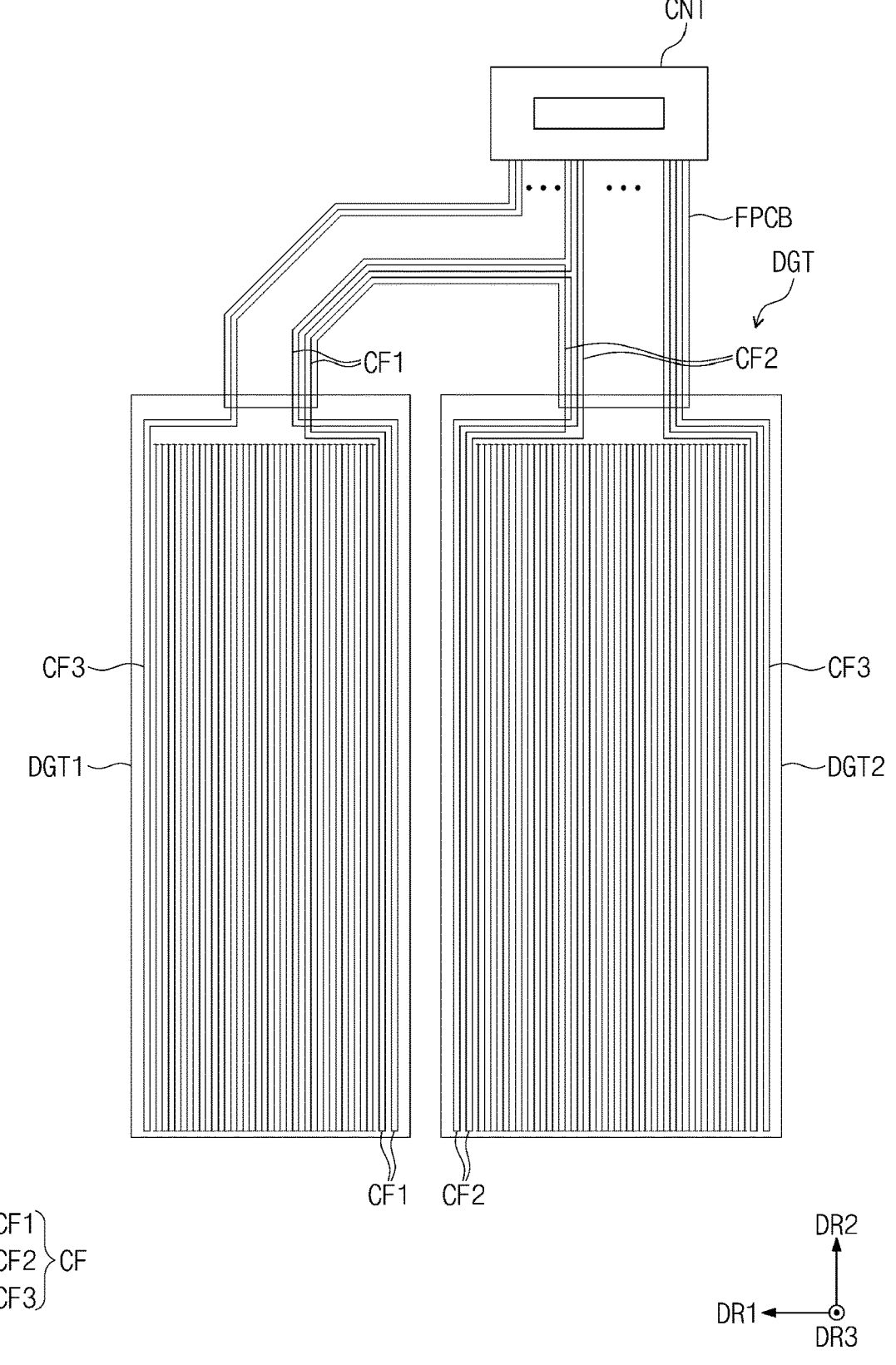
FIG. 13 is a plan view illustrating second sensing coils of a digitizer illustrated in FIG. 7.

FIG. 12 is a plan view illustrating first sensing coils of a digitizer DGT illustrated in FIG. 7. FIG. 13 is a plan view illustrating second sensing coils of a digitizer illustrated in FIG. 7;

Referring to FIGS. 12 and 13, the first digitizer DGT1 and the second digitizer DGT2 may be adjacent to each other in the first direction DR1. When viewed on the plan view, the second digitizer DGT2 may have an area (e.g., planar area) greater than an area (e.g., planar area) of the first digitizer DGT1. Relative planar areas of the first digitizer DGT1 and the second digitizer DGT2 are indicated in the plan view of the plane defined by the first direction DR1 and the second direction DR2, in FIG. 12.

The display device DD may include a flexible circuit board FPCB connecting the first digitizer DGT1 to the second digitizer DGT2, and a connector CNT connected to the flexible circuit board FPCB. The flexible circuit board FPCB may be connected to the first digitizer DGT1 and to the second digitizer DGT2 to connect the first digitizer DGT1 and the second digitizer DGT2 to each other. Although not shown, the connector CNT may be connected to a main board. An integrated circuit chip for driving the digitizer DGT may be disposed on the main board.

The digitizer DGT may include a plurality of first sensing coils RF and a plurality of second sensing coils CF. The first sensing coils RF may be disposed on the second sensing coils CF, and the laminated structure will be illustrated in FIG. 14 below. The first sensing coils RF may be defined as X-axis coils extending in the first direction DR1. The second sensing coils CF may be defined as Y-axis coils extending in the second direction DR2.

Referring to FIG. 12, the first and second digitizers DGT1 and DGT2 may include a plurality of first sensing coils RF. The first sensing coils RF may extend in a loop shape by having a dimension which is longer in the first direction DR1, from each of the first and second digitizers DGT1 and DGT2.

The first sensing coils RF of the first digitizer DGT1 may be connected to the first sensing coils RF of the second digitizer DGT2, through the flexible circuit board FPCB.

Specifically, each of the first sensing coils RF may extend from the connector CNT to the first digitizer DGT1, through the flexible circuit board FPCB.

The first sensing coils RF may extend from the first digitizer DGT1 in a loop shape, to extend to the second digitizer DGT2, through the flexible circuit board FPCB. The first sensing coils RF extending from the second digitizer DGT2 may extend in a loop shape from the second digitizer DGT2 and then be connected to the connector CNT through the flexible circuit board FPCB.

That is, one end (e.g., a first end) of each of the first sensing coils RF may be connected to the connector CNT. Each of the first sensing coils RF may extend from the first end thereof, in order to the flexible circuit board FPCB, the first digitizer DGT1, back to the flexible circuit board FPCB, the second digitizer DGT2, and back the flexible circuit board FPCB, to terminate at the other end (e.g., the second end opposite to the first end) of each of the first sensing coils RF which is at and connected to the connector CNT.

Since the first sensing coils RF of the first digitizer DGT1 and the first sensing coils RF of the second digitizer DGT2 are connected to each other to form the loop shape, X-axis coils of the digitizer DGT may be provided.

For example, some of the first sensing coils RF, which extend in the loop shape, are illustrated, and left and right portions of the remaining first sensing coils RF are omitted. Also, the first sensing coils RF are illustrated in the state of extending from the first and second digitizers DGT1 and DGT2 in the first direction DR1. In the first and second digitizers DGT1 and DGT2, the first sensing coils RF may extend in the first direction DR1 and be arranged in the second direction DR2.

Referring to FIG. 13, the first and second digitizers DGT1 and DGT2 may include second sensing coils CF. The second sensing coils CF may extend in the loop shape by having a dimension which is longer in the second direction DR2, from each of the first and second digitizers DGT1 and DGT2. The number of second sensing coils CF of the first digitizer DGT1 may be less than the number of second sensing coils CF of the second digitizer DGT2.

One side of the first digitizer DGT1 and one side of the second digitizer DGT2 may face each other. The second sensing coils CF may include second-1 sensing coils CF1 adjacent to one side of the first digitizer DGT1, second-2 sensing coils CF2 adjacent to one side of the second digitizer DGT2, and second-third sensing coils CF3 defined as the remaining second sensing coils CF except for the second-1 and second-2 sensing coils CF1 and CF2.

The second-1 sensing coils CF1 of the first digitizer DGT1 may be connected to the second-2 sensing coils CF2 of the second digitizer DGT2, through the flexible circuit board FPCB. The second-1 sensing coils CF1 may extend from the connector CNT to the first digitizer DGT1, through the flexible circuit board FPCB. The second-2 sensing coils CF2 may extend from the connector CNT to the second digitizer DGT2, through the flexible circuit board FPCB.

The second-1 sensing coils CF1 may extend from the first digitizer DGT1 in the loop shape to extend to the flexible circuit board FPCB. The second-2 sensing coils CF2 may extend from the second digitizer DGT2 in a loop shape and then extend to the flexible circuit board FPCB so as to be connected to the second-1 sensing coils CF1.

The second-1 sensing coils CF1 and the second-2 sensing coils CF2 may be substantially integrated with each other. That is, one end of each of the second sensing coils CF (e.g., second sensing coils CF adjacent to one side of the first digitizer DGT1) may be connected to the connector CNT, and also, some second sensing coils CF may extends to the flexible circuit board FPCB, the first digitizer DGT1, the flexible circuit board FPCB, the second digitizer DGT2, and the flexible circuit board FPCB, and the other end of each of the some second sensing coils CF may be connected to the connector CNT.

The second-3 sensing coils CF3 of the first digitizer DGT1 may be connected to the connector CNT to extend to the first digitizer DGT1, through the flexible circuit board FPCB, thereby providing the loop shape in the first digitizer DGT1. The second-3 sensing coils CF3 of the second digitizer DGT2 may be connected to the connector CNT to extend to the second digitizer DGT2 through the flexible circuit board FPCB, thereby providing the loop shape in the second digitizer DGT2.

The second-1, second-2, and 2-3 sensing coils CF1, CF2, and CF3 may extend in the second direction DR2 to provide the loop shape, and thus, the Y-axis coils of the digitizer DGT may be provided.

For example, some of the second sensing coils CF extending in the loop shape are illustrated, and upper and lower portions of the remaining second sensing coils CF are omitted. Also, the first and second digitizers DGT1 and DGT2 are illustrated in the state of extending in the second direction DR2. In the first and second digitizers DGT1 and DGT2, the second sensing coils CF may extend in the second direction DR2 and be arranged in the first direction DR1.

In an embodiment of the invention, the second sensing coils CF may be defined as driving coils, and the first sensing coils RF may be defined as sensing coils, but are not limited thereto, and vice versa. When current flows through the second sensing coils CF, lines of magnetic force may be induced between the second sensing coils CF and the first sensing coils RF. The first sensing coils RF may sense the induced electromagnetic force emitted from an electromagnetic pen to output sensing signals to one terminal of each of the first sensing coils RF.

Since the first digitizer DGT1 and the second digitizer DGT2 are separated from each other, sensitivity of the digitizer DGT adjacent to the separated portion may be lowered. In an embodiment of the invention, since the second-1 sensing coils CF1 adjacent to one side of the first digitizer DGT1 and the second-2 sensing coils CF2 adjacent to one side of the second digitizer DGT2 are connected to each other, the sensitivity of the digitizer DGT adjacent to the separated portion may be improved.

Figure 14:
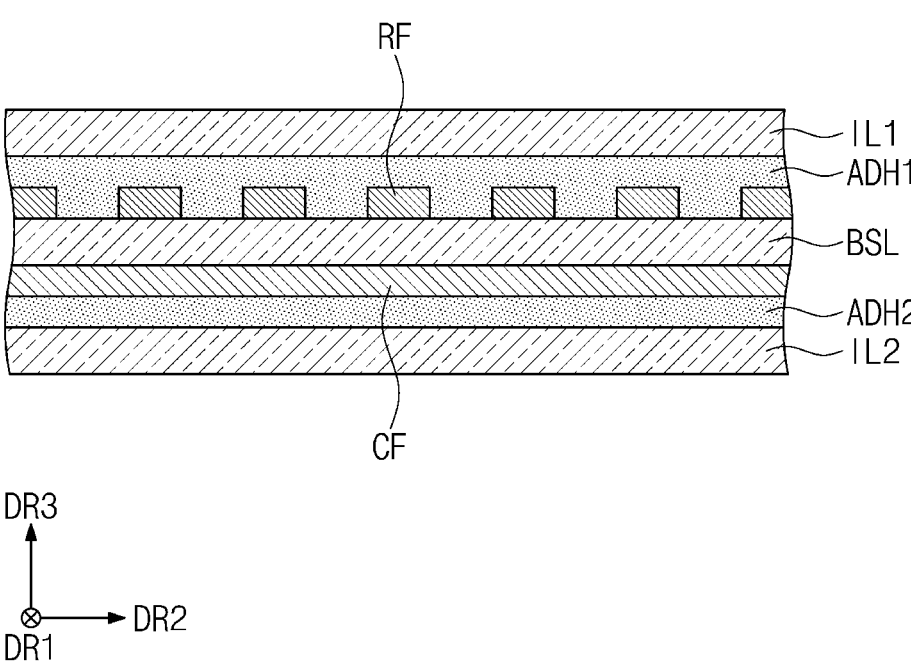
FIG. 14 is a cross-sectional view illustrating a laminated configuration of some of the first sensing coils and some of the second sensing coils illustrated in FIGS. 12 and 13.

FIG. 14 is a view illustrating a laminated configuration of some of the first sensing coils RF and some of the second sensing coils CF illustrated in FIGS. 12 and 13.

For example, FIG. 14 illustrates a cross section of the digitizer DGT when viewed in the first direction DR1.

Referring to FIGS. 12, 13, and 14, first sensing coils RF may be disposed on a digitizer base layer BSL, and second sensing coils CF may be disposed below the digitizer base layer BSL. A first adhesive layer ADH1 may be disposed on the digitizer base layer BSL. The first adhesive layer ADH1 may be disposed on the digitizer base layer BSL to cover the first sensing coils RF. A second adhesive layer ADH2 may be disposed below the digitizer base layer BSL. The second adhesive layer ADH2 may be disposed below the digitizer base layer BSL to cover the second sensing coils CF.

A first insulating layer IL1 may be disposed on the first adhesive layer ADH1. A second insulating layer IL2 may be disposed on the second adhesive layer IL2. The digitizer base layer BSL, the first insulating layer IL1, and the second insulating layer IL2 may include polyimide as the same material. Each of the first and second adhesive layers ADH1 and ADH2 may include a pressure sensitive adhesive. The first sensing coils RF and the second sensing coils CF may be on opposing sides of the digitizer base layer BSL and intersect each other in the plan view.

Figure 15:
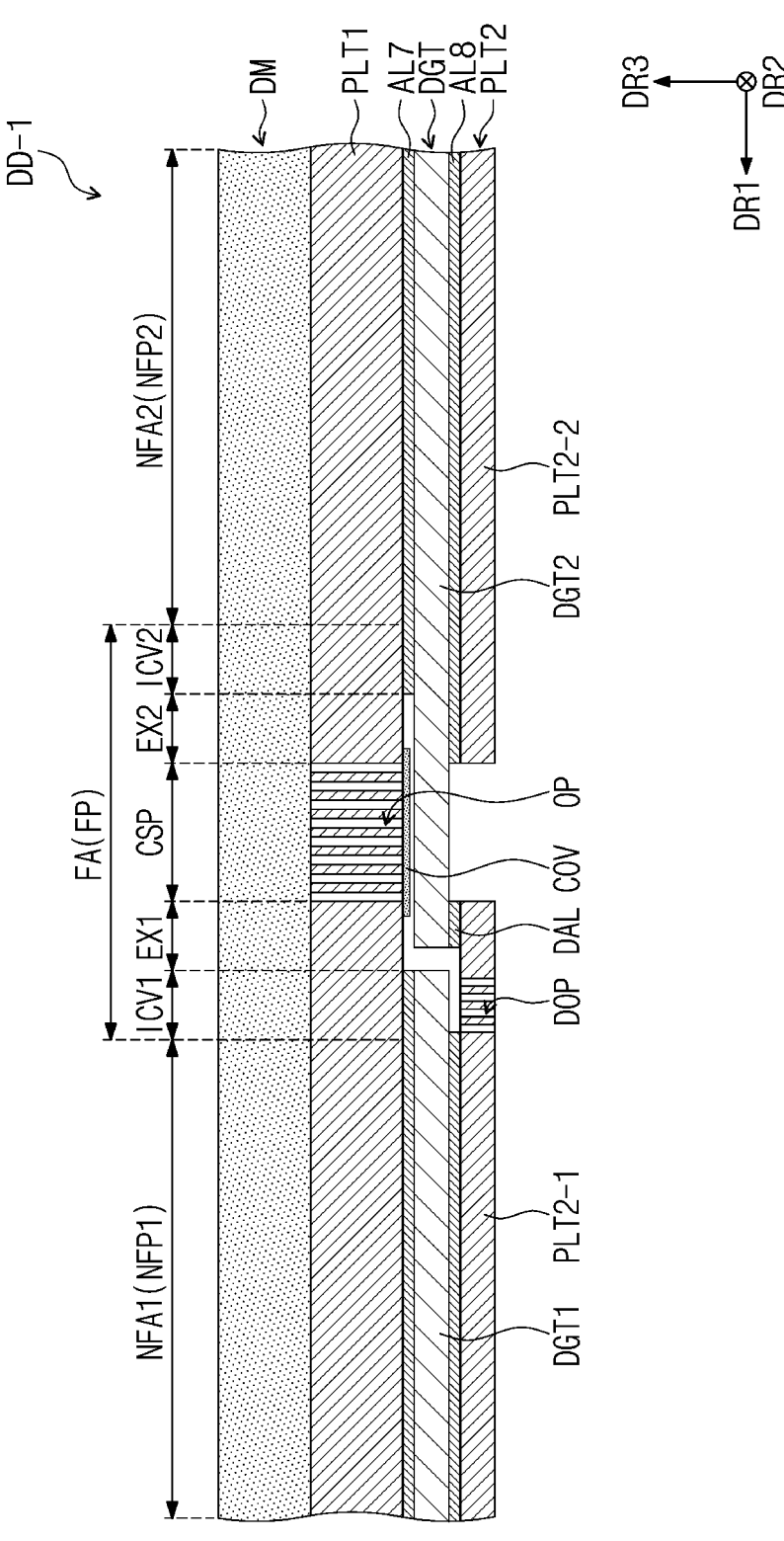
FIG. 15 is a cross-sectional view illustrating a configuration of a display device according to another embodiment of the invention.
Figure 16:
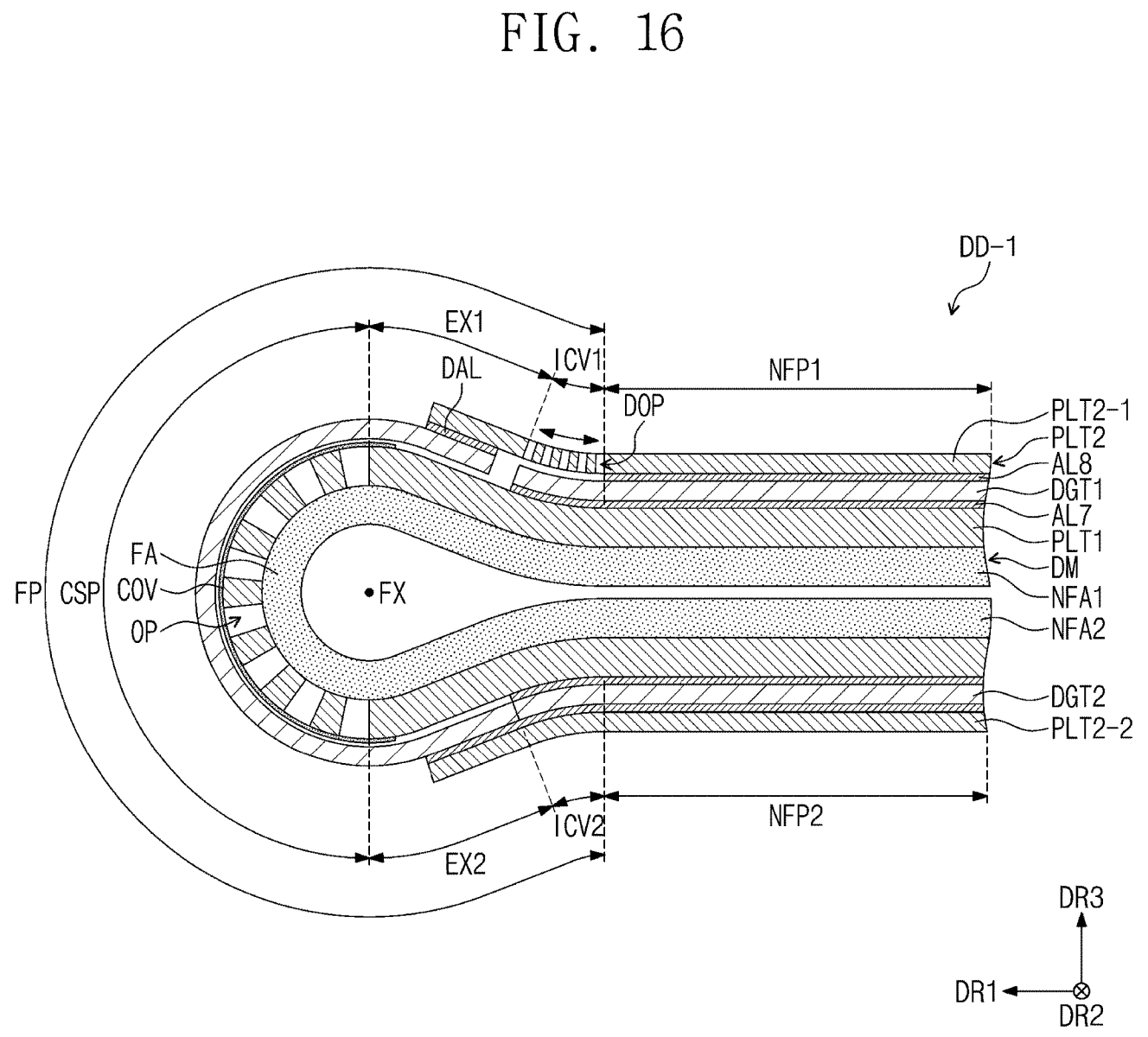

FIG. 15 is a view illustrating a configuration of a display device DD-1 according to another embodiment of the invention. FIG. 16 is a view illustrating a folded state of the display device DD-1 of FIG. 15.

For example, FIG. 15 is a cross-sectional view corresponding to the cross-section illustrated in FIG. 10, and FIG. 16 is a cross-sectional view corresponding to the cross-section illustrated in FIG. 11.

Hereinafter, configuration of the display device DD-1 illustrated in FIGS. 15 and 16 will be described, focusing on configurations different from those of the display device DD illustrated in FIGS. 10 and 11.

Referring to FIG. 15, a second digitizer DGT2 may be attached to a second-1 support plate PLT2-1. A dummy adhesive layer DAL may be disposed below a first extension portion EX1, and between an inner end portion of the second digitizer DGT2 and an inner end portion of the second-1 support plate PLT2-1. The second digitizer DGT2 may be attached to the second-1 support plate PLT2-1 by the dummy adhesive layer DAL.

When viewed on a plane, a plurality of dummy openings DOP may be defined in a portion of the second-1 support plate PLT2-1 overlapping a first inverse curvature portion ICV1. An eighth adhesive layer AL8 may not be disposed on the portion of the second-1 support plate PLT2-1 overlapping the first inverse curvature portion ICV1. Flexibility of the portion of the second-1 support plate PLT2-1 overlapping the first inverse curvature portion ICV1 may be improved by the dummy openings DOP.

Referring to FIG. 16, when the display device DD-1 is folded, since a curvature radius of the second digitizer DGT2 disposed outside is large, tensile force may be generated in the second digitizer DGT2. However, since the dummy openings DOP are disposed in the second-1 support plate PLT2-1, the portion of the second-1 support plate PLT2-1 overlapping the first inverse curvature portion ICV1 may be expanded or lengthened in a direction along the digitizer DGT, as illustrated by the double-headed arrow in FIG. 16 (at the first inverse curvature portion ICV1). Since the portion of the second-1 support plate PLT2-1 overlapping the first inverse curvature portion ICV1 is extended, the tensile force generated in the second digitizer DGT2 may be alleviated.

Figure 17:
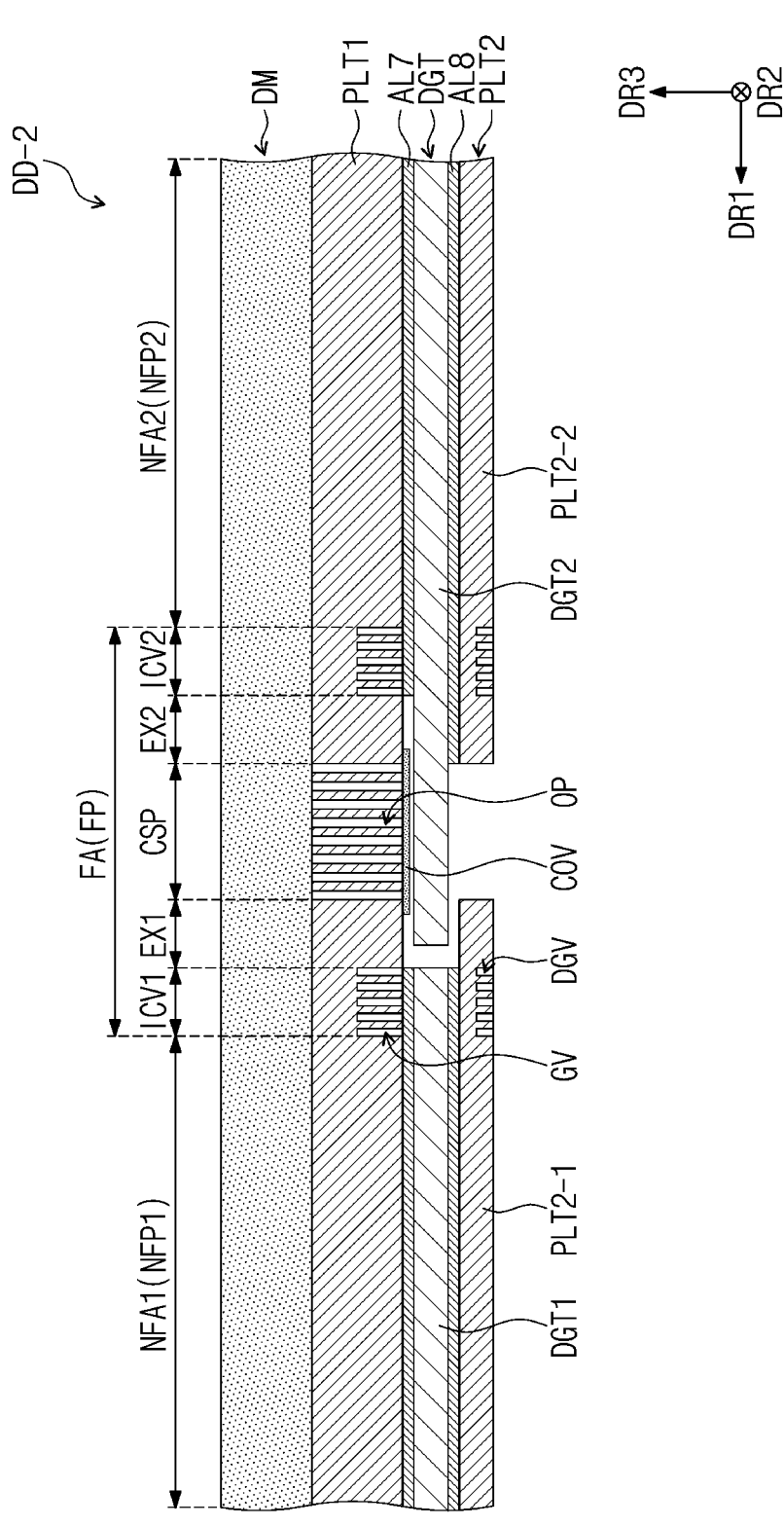
FIG. 17 is a cross-view illustrating a configuration of a display device according to another embodiment of the invention.
Figure 18:
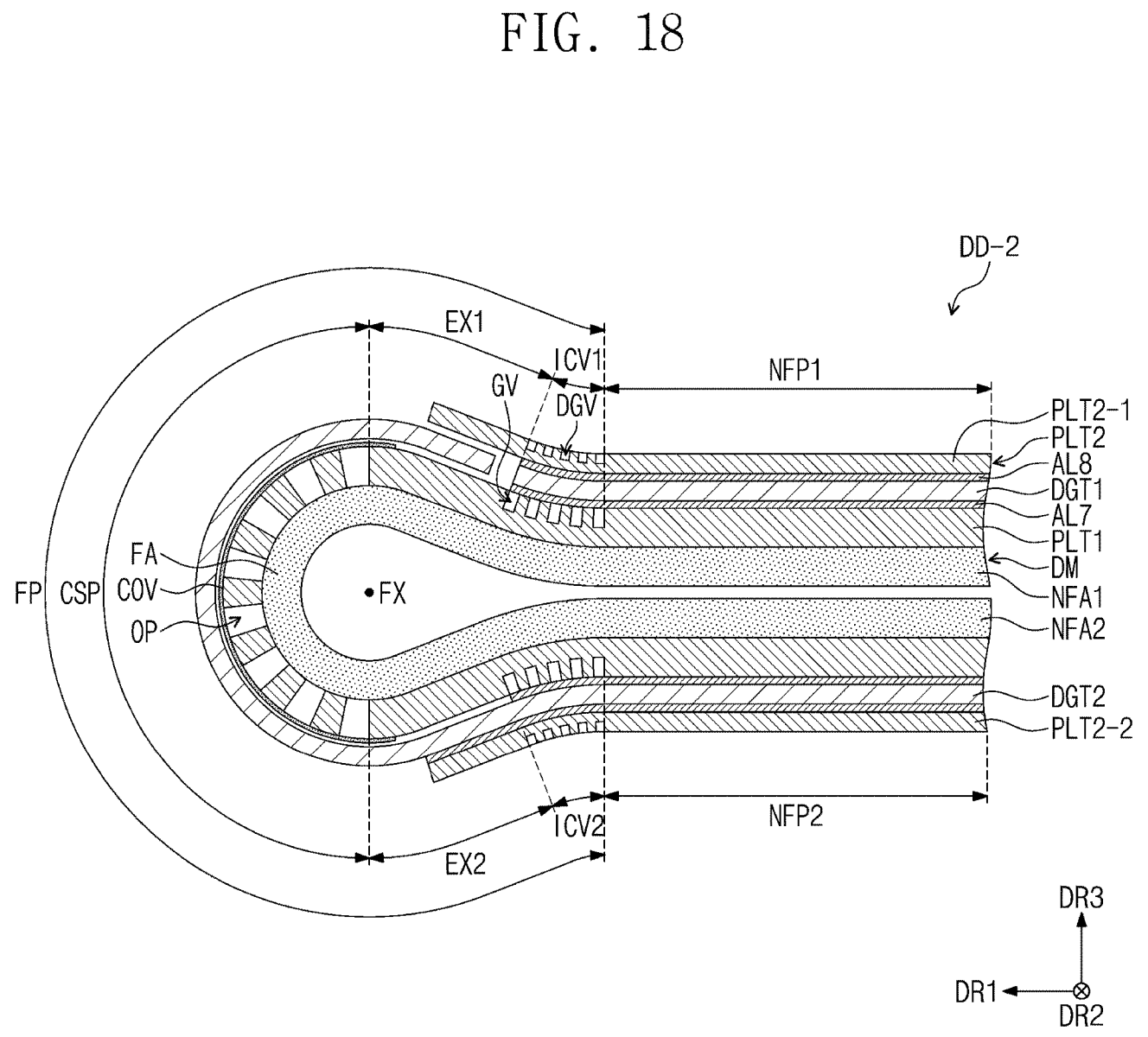

FIG. 17 is a view illustrating a configuration of a display device DD-2 according to another embodiment of the invention. FIG. 18 is a view illustrating a folded state of the display device DD-2 of FIG. 17.

For example, FIG. 17 is a cross-sectional view corresponding to the cross-section illustrated in FIG. 10, and FIG. 18 is a cross-sectional view corresponding to the cross-section illustrated om FIG. 11.

Hereinafter, configuration of the display device DD-2 illustrated in FIGS. 17 and 18 will be described, focusing on configurations different from those of the display device DD illustrated in FIGS. 10 and 11.

Referring to FIG. 17, a plurality of grooves GV may be defined recessed from bottom surfaces of the first support plate PLT1 respectively at the first and second inverse curvature portions ICV1 and ICV2. Flexibility of the first and second inverse curvature portions ICV1 and ICV2 may be improved by the grooves GV. The grooves GV may be open in a direction toward the digitizer DGT and may extend into a partial thickness of the first support plate PLT1.

A plurality of dummy grooves DGV may be defined in bottom surfaces of the second support plate PLT2 at portions of the second-1 and second-2 support plates PLT2-1 and PLT2-2 overlapping first and second inverse curvature portions ICV1 and ICV2, respectively. The flexibility of the portions of the second-1 and second-2 support plates PLT2-1 and PLT2-2 overlapping the first and second inverse curvature portions ICV1 and ICV2 may be improved by the dummy grooves DGV. Here, the dummy grooves DGV may be open in a direction away from the digitizer DGT and may extend into a partial thickness of the second support plate PLT2.

Referring to FIG. 18, when the display device DD-2 is folded, since the flexibility of the first and second inverse curvature portions ICV1 and ICV2 is improved by the grooves GV, the first and second inverse curvatures portions ICV1 and ICV2 may be more easily bent.

When the display device DD-2 is folded, the second-1 and second-2 support plates PLT2-1 and PLT2-2 overlapping the first and second inverse curvature portions ICV1 and ICV2 may be improved in flexibility by the dummy grooves DGV. Thus, the portions of the second-1 and second-2 support plates PLT2-1 and PLT2-2 overlapping the first and second inverse curvature portions ICV1 and ICV2 may be easily bent.

According to one or more embodiment of the invention, the second digitizer DGT2 may extend from the second non-folding part NFP2 of the first support plate PLT1 and into the folding part FP of the first support plate PLT1, along a lower surface of the first support plate PLT1, and be disposed between the first support plate PLT1 and the second-1 support plate PLT2-1 of the second support plate PLT2. When the first support plate PLT1 is folded, since the second digitizer DGT2 is disposed between the first support plate PLT1 and the second-1 support plate PLT2-1, the second digitizer DGT2 may be easily bent along the folding part FP to have a curved shape corresponding to that of the folding part FP.

In an embodiment, a second support plate PLT2 which faces the display module DM with the digitizer DGT and the first support plate PLT1 includes a first plate (e.g., the second-1 support plate PLT2-1) which corresponds to the first digitizer DGT1 and a second plate (e.g., the second-2 support plate PLT2-2) which corresponds to the second digitizer DGT2 and is adjacent to the first plate along the first direction DR1.

In an embodiment, a first support plate PLT1 faces the display module DM and includes a first non-folding portion (e.g., NFP1 together with ICV1 and EX1), a second non-folding portion (e.g., NFP2 together with ICV2 and EX2), and a curvable portion (e.g., CSP) which is foldable about a folding axis FX and connects the first non-folding portion to the second non-folding portion. A second support plate PLT2 faces the display module DM with the first support plate PLT1 therebetween. A digitizer DGT is between the first support plate PLT1 and the second support plate PLT2 and includes a first digitizer DGT1 corresponding to the first non-folding portion, and a second digitizer DGT2 which is adjacent to the first digitizer DGT1 along a first direction DR1 and corresponds to the second non-folding portion. Referring to FIGS. 10, 11 and 15-18, for example, the second digitizer DGT2 extends from the second non-folding portion and further than the curvable portion (taken only as CSP related to the folding axis FX) to define an extended portion of the second digitizer DGT2 which correspond to the first non-folding portion (e.g., the end portion at EX1).

In an embodiment, a display module DM, a first support plate PLT1, a digitizer DGT and a second support plate PLT2 are in order along a thickness direction of the display device DD. The digitizer DGT includes a first digitizer DGT1, a second digitizer DGT2 which is spaced apart from the first digitizer DGT1 along a first direction DR1, and a first gap between the first digitizer DGT1 and the second digitizer DGT2 (e.g., the first gap corresponding to EX1). The second support plate PLT2 includes a first plate which corresponds to the first digitizer DGT1, a second plate which corresponds to the second digitizer DGT2 and is spaced apart from the first plate along the first direction DR1, and a second gap between the first plate and the second plate (e.g., the second gap correspond to CSP). The first gap of the digitizer DGT is spaced apart from the second gap of the second support plate PLT2, along the first direction DR1. Referring to FIGS. 10, 15 and 17, for example, the gaps are offset and not aligned with each other in the thickness direction.

It will be apparent to those skilled in the art that various modifications and variations can be made in the invention. Thus, it is intended that the invention covers the modifications and variations of this invention provided they come within the scope of the appended claims and their equivalents. Thus, to the maximum extent allowed by law, the scope of the invention is to be determined by the broadest permissible interpretation of the following claims and their equivalents, and shall not be restricted or limited by the foregoing detailed description.

What is claimed is:

1. A display device comprising:
a display module;
a first support plate disposed below the display module;
a first digitizer disposed below the first support plate;
a second digitizer disposed below the first support plate and spaced apart from the first digitizer in a first direction with a gap therebetween;
a second-1 support plate disposed below the first digitizer; and
a second-2 support plate disposed below the second digitizer,
wherein
inner side surfaces of the first digitizer and the second digitizer face each other at the gap, and
the inner side surface of the second digitizer overlaps the second-1 support plate.

2. The display device of claim 1, wherein, when the first support plate is folded and unfolded, the second digitizer is slid to move between the second-1 support plate and the first support plate.

3. The display device of claim 1, wherein, when viewed on a plane, the second digitizer has an area greater than that of the first digitizer.

4. The display device of claim 1, wherein
the first support plate comprises:
a first non-folding part, a folding part and a second non-folding part arranged along the first direction, and
a plurality of openings defined in the folding part,
the first digitizer is disposed below the first non-folding part, and
the second digitizer is disposed below the second non-folding part and the folding part.

5. The display device of claim 4, wherein
the first digitizer is attached to the first non-folding part and the second-1 support plate, and the second digitizer is attached to the second non-folding part and the second-2 support plate, but is not attached to the second-1 support plate.

6. The display device of claim 4, wherein the folding part comprises:
a first extension portion;
a second extension portion;
a curved portion disposed between the first extension portion and the second extension portion, bent at a predetermined curvature, and in which the openings are defined;
a first inverse curvature portion disposed between the first extension portion and the first non-folding part and bent to a side opposite to the curved portion; and
a second inverse curvature portion disposed between the second extension portion and the second non-folding part, bent to a side opposite to the curved portion.

7. The display device of claim 6, further comprising a cover layer which is between the curved portion and the second digitizer.

8. The display device of claim 6, wherein
the first digitizer is disposed below the first non-folding part to extend below the first inverse curvature portion, and
the second digitizer is disposed below the second non-folding part to extend below the second inverse curvature portion, the second extension portion, the curved portion, and the first extension portion.

9. The display device of claim 8, wherein the second digitizer is not attached to the first extension portion, the second extension portion, and the curved portion.

10. The display device of claim 8, wherein when the folding part is bent and the first support plate is folded, the second digitizer is bent along the curved portion.

11. The display device of claim 8, wherein
the inner side surface of the second digitizer is disposed between the first extension portion and the second-1 support plate, and
when the first support plate is folded and unfolded, the inner side surface of the second digitizer moves between the first extension portion and the second-2 support plate.

12. The display device of claim 8, wherein when the first support plate is folded and unfolded, the second digitizer does not move outside the second-1 support plate.

13. The display device of claim 6, wherein
the second-1 support plate extends from below the first non-folding part to below the first inverse curvature portion and below the first extension portion, and
the second-2 support plate extends from below the second non-folding part to below the second inverse curvature portion and below the second extension portion.

14. The display device of claim 6, wherein the second digitizer is attached to the second-1 support plate.

15. The display device of claim 14, wherein a plurality of dummy openings are defined in a portion of the second-1 support plate, which overlaps the first inverse curvature portion.

16. The display device of claim 6, wherein
a plurality of grooves are defined in bottom surfaces of the first and second inverse curvature portions, and
a plurality of dummy grooves are defined in bottom surfaces of portions of the second-1 and second-2 support plates, which overlap the first and second inverse curvature portions.

17. The display device of claim 1, further comprising a flexible circuit board which connects the first and second digitizers to each other,
wherein
each of the first and second digitizers comprises:
a plurality of first sensing coils extending along the first direction;
a plurality of second sensing coils extending along a second direction crossing the first direction, and
the first sensing coils of the first digitizer are connected to the first sensing coils of the second digitizer, through the flexible circuit board.

18. The display device of claim 17, wherein
the number of second sensing coils of the first digitizer is less than that of second sensing coils of the second digitizer,
the second-1 sensing coils adjacent to the inner side surface of the first digitizer among the second sensing coils and the second-2 sensing coils adjacent to the inner side surface of the second digitizer among the second sensing coils are connected to each other through the flexible circuit board.

19. A display device comprising:
a display module;
a first support plate disposed below the display module and comprising a first non-folding part, a folding part, and a second non-folding part;
a first digitizer disposed below the first non-folding part;
a second digitizer disposed below the second non-folding part;
a second-1 support plate disposed below the first digitizer; and
a second-2 support plate disposed below the second digitizer,
wherein
inner side surfaces of the first digitizer and the second digitizer face each other within the folding part, and
the inner side surface of the second digitizer overlaps the second-1 support plate.

20. A display device comprising:
a display module;
a first support plate disposed below the display module and comprising a first non-folding part, a folding part, and a second non-folding part;
a first digitizer disposed below the first non-folding part;
a second digitizer disposed below the second non-folding part;
a second-1 support plate disposed below the first digitizer; and
a second-2 support plate disposed below the second digitizer,
wherein
inner side surfaces of the first digitizer and the second digitizer face each other within the folding part,
the second digitizer extends between the second-1 support plate and the first support plate between the second non-folding part and the second-2 support plate, and
when viewed on a plane, the second digitizer has an area greater than that of the first digitizer and includes the inner side surface of the second digitizer overlapping the second-1 support plate.

* * * * *